US012330899B2

(12) United States Patent
Yamamoto

(10) Patent No.: US 12,330,899 B2
(45) **Date of Patent: *Jun. 17, 2025**

(54) IMAGE FORMING SYSTEM

(71) Applicant: CANON KABUSHIKI KAISHA, Tokyo (JP)

(72) Inventor: Naoyuki Yamamoto, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/443,153

(22) Filed: Feb. 15, 2024

(65) Prior Publication Data

US 2024/0190677 A1 Jun. 13, 2024

Related U.S. Application Data

(63) Continuation of application No. 17/823,886, filed on Aug. 31, 2022, now Pat. No. 11,932,508.

(30) Foreign Application Priority Data

Sep. 6, 2021 (JP) ................................ 2021-144804

(51) Int. Cl.
*B65H 37/00* (2006.01)
*G03G 15/00* (2006.01)

(52) U.S. Cl.
CPC ......... *B65H 37/00* (2013.01); *G03G 15/6582* (2013.01); *B65H 2511/13* (2013.01);
(Continued)

(58) Field of Classification Search
CPC .......... G03G 15/6582; G03G 15/6588; G03G 2215/00801; B65H 37/00;
(Continued)

(56) References Cited

U.S. PATENT DOCUMENTS 8,190,076 B2 * 5/2012 Omata .............. G03G 15/6573 399/231
11,932,508 B2 * 3/2024 Yamamoto ............ B65H 37/00
(Continued)

FOREIGN PATENT DOCUMENTS

JP 2009102480 A 5/2009
JP 2012118371 A 6/2012
(Continued)

*Primary Examiner* — Sophia S Chen
(74) *Attorney, Agent, or Firm* — Canon U.S.A., Inc. IP Division

(57) ABSTRACT

An image forming system includes an image forming unit, a varnish, a receiving unit, and a control unit. The image forming unit executes image forming processing to form an image on a plurality of types of recording media including a first type recording medium having a coated layer and a second type recording medium that is without a coated layer. The varnish application unit executes varnish application processing to apply varnish to a recording medium on which the image is formed by the image forming unit. The receiving unit receives an instruction for selecting a recording medium and to receive an instruction for the varnish application processing. The control unit performs control to prevent the receiving unit from receiving an instruction to execute the varnish application processing on the second type recording medium.

11 Claims, 11 Drawing Sheets

(52) U.S. Cl.
CPC ...... *B65H 2551/21* (2013.01); *B65H 2801/27* (2013.01); *G03G 2215/00801* (2013.01)

(58) Field of Classification Search
CPC ........ B65H 2301/5114; B65H 2511/13; B65H 2551/21; B65H 2801/27
See application file for complete search history.

(56) References Cited

U.S. PATENT DOCUMENTS

| | | | | |
|---|---|---|---|---|
| 2007/0292665 A1* | 12/2007 | Fukunaga | ............ | G03G 7/0026<br>156/60 |
| 2023/0069158 A1* | 3/2023 | Suzuki | ............... | G03G 15/6582 |

FOREIGN PATENT DOCUMENTS

| | | |
|---|---|---|
| JP | 2013010236 A | 1/2013 |
| JP | 2021103265 A | 7/2021 |

* cited by examiner

FIG.3

| TYPE OF RECORDING MEDIUM S | BASIS WEIGHT OF RECORDING MEDIUM S ($g/m^2$) | | | | | | | | | | | | | | | | | | |
|---|---|---|---|---|---|---|---|---|---|---|---|---|---|---|---|---|---|---|---|
| | 51.4 | 52.3 | 64 | 73.2 | 73.3 | 81.4 | 84.7 | 84.9 | 100.1 | 104.7 | 115.5 | 127.9 | 144 | 157 | 158 | 180 | 200 | 209.3 | 250 |
| NON-COATED PAPER (PLAIN PAPER/ THICK PAPER) | | H | H | | | 2H | | | | 2H | | 2H | | 3H | | | | 3H | |
| COATED PAPER | | 6H | | | 6H | | | 6H | | 7H | | 7H | | 7H | | | 7H | | |
| SYNTHETIC PAPER | 6H | | | 6H | | | 6H | | 6H | | 6H | | | | 6H | | 7H | | |
| RESINOUS MEDIUM | | | | | | | | | | | | | 7H | | | 7H | | | 7H |

FIG.8

| | BASIS WEIGHT OF RECORDING MEDIUM S ($g/m^2$) | | | | | |
|---|---|---|---|---|---|---|
| | 52 $g/m^2$ | 73.3 $g/m^2$ | 79.1 $g/m^2$ | 84.9 $g/m^2$ | 104.7 $g/m^2$ | 127.9 $g/m^2$ |
| GURLEY STIFFNESS | 0.17 mN | 0.33 mN | 0.51 mN | 0.49 mN | 0.96 mN | 1.63 mN |
| THICKNESS OF RECORDING MEDIUM | 48 μm | 56 μm | 60 μm | 67 μm | 82 μm | 101 μm |
| THICKNESS OF VARNISH LAYER 10 μm | 12.5 mm | 8.1 mm | 6.3 mm | 3.8 mm | 2.3 mm | 2.0 mm |
| THICKNESS OF VARNISH LAYER 20 μm | 18.4 mm | 11.0 mm | 7.2 mm | 4.5 mm | 2.3 mm | 2.1 mm |
| THICKNESS OF VARNISH LAYER 30 μm | 22.1 mm | 13.5 mm | 8.5 mm | 5.5 mm | 2.3 mm | 2.1 mm |

IMAGE FORMING SYSTEM

CROSS REFERENCE TO RELATED APPLICATIONS

The present application is a continuation of U.S. patent application Ser. No. 17/823,886, filed on Aug. 31, 2022, which claims priority from Japanese Patent Application No. 2021-144804, filed Sep. 6, 2021, all of which are hereby incorporated by reference herein in their entireties.

BACKGROUND

Field

The present disclosure relates to an image forming system which executes varnish application processing on a recording medium on which a toner image is formed.

Description of the Related Art

Generally, an electrophotographic image forming apparatus is provided with a plurality of sheet feeding cassettes from which recording media are conveyed and can arbitrarily select from recording media of various sizes and types to execute printing.

Therefore, in recent years, by taking advantage of the capability to perform small-lot printing and the feature of variable printing, electrophotographic image forming apparatuses have been introduced to a production market where offset printing machines have been in the mainstream.

Further, in the recent production market, surface processing using varnish mainly composed of a resin and a solvent medium has been executed on a recording medium on which an image is formed by an image forming apparatus for the purpose of giving a luster to, protecting and/or decorating the surface of the recording medium (Japanese Patent Application Laid-Open No. 2007-176044).

Meanwhile, in recent years, there has been proposed an image forming system that includes a post-processing apparatus connected to an image forming apparatus that forms an image on a recording medium and consecutively executes a series of processing from image formation to post-processing on a recording medium to realize in-line printing. As the post-processing apparatus connected to the image forming apparatus, there has been considered a varnish application apparatus that executes the foregoing surface processing using varnish.

However, the surface processing using varnish which is executed by the varnish application apparatus is not always applicable to all of recording media on which the image forming processing apparatus executes image forming processing. Accordingly, there has been a case where, if a recording medium to which the varnish application apparatus cannot easily apply varnish is conveyed to the varnish application apparatus from the image forming apparatus, surface processing cannot be executed sufficiently on the surface of the recording medium, and products desired by the user cannot be acquired.

The present disclosure is directed to an image forming system that executes in-line varnish application processing on a recording medium on which the image forming apparatus forms an image and is capable of preventing a situation where products desired by the user cannot be acquired.

SUMMARY

According to an aspect of the present disclosure, an image forming system includes an image forming unit configured to execute image forming processing to form an image on a plurality of types of recording media including a first type recording medium having a coated layer and a second type recording medium that is without a coated layer, a varnish application unit configured to execute varnish application processing to apply varnish to a recording medium on which the image is formed by the image forming unit, a receiving unit configured to receive an instruction for selecting a recording medium and to receive an instruction for the varnish application processing, and a control unit configured to perform control to prevent the receiving unit from receiving an instruction to execute the varnish application processing on the second type recording medium.

Further features of the present disclosure will become apparent from the following description of exemplary embodiments with reference to the attached drawings.

BRIEF DESCRIPTION OF THE DRAWINGS

FIG. 3 is a table illustrating an evaluation result of adhesiveness of a varnish layer to a sheet.

FIG. 8 is a table illustrating an evaluation result of a curl amount and a basis weight of a sheet.

DESCRIPTION OF THE EMBODIMENTS

Hereinafter, exemplary embodiments of the present disclosure will be described in detail with reference to the appended drawings.

However, sizes, media, shapes, and relative arrangement of components described in the present exemplary embodiments are not intended to limit the scope of the present disclosure, unless such limitations are explicitly mentioned herein.

First, a configuration of an image forming system 1000 according to a first exemplary embodiment will be described with reference to FIGS. 1 and 2. In the image forming system 1000 according to the present exemplary embodiment, an image forming apparatus 100 that forms a toner image on a recording medium S is connected to a varnish application apparatus 200 that applies varnish to the recording medium S to which the toner image is fixed by the image forming apparatus 100.

The image forming apparatus 100 and the varnish application apparatus 200 are serially connected to each other, so that the varnish application apparatus 200 can apply varnish to a recording medium conveyed from the image forming apparatus 100. In other words, varnish application processing can be executed on the recording medium before the recording medium fed by the image forming apparatus 100 is discharged to the outside of the image forming system 1000.

Image Forming Apparatus

Figure 1:
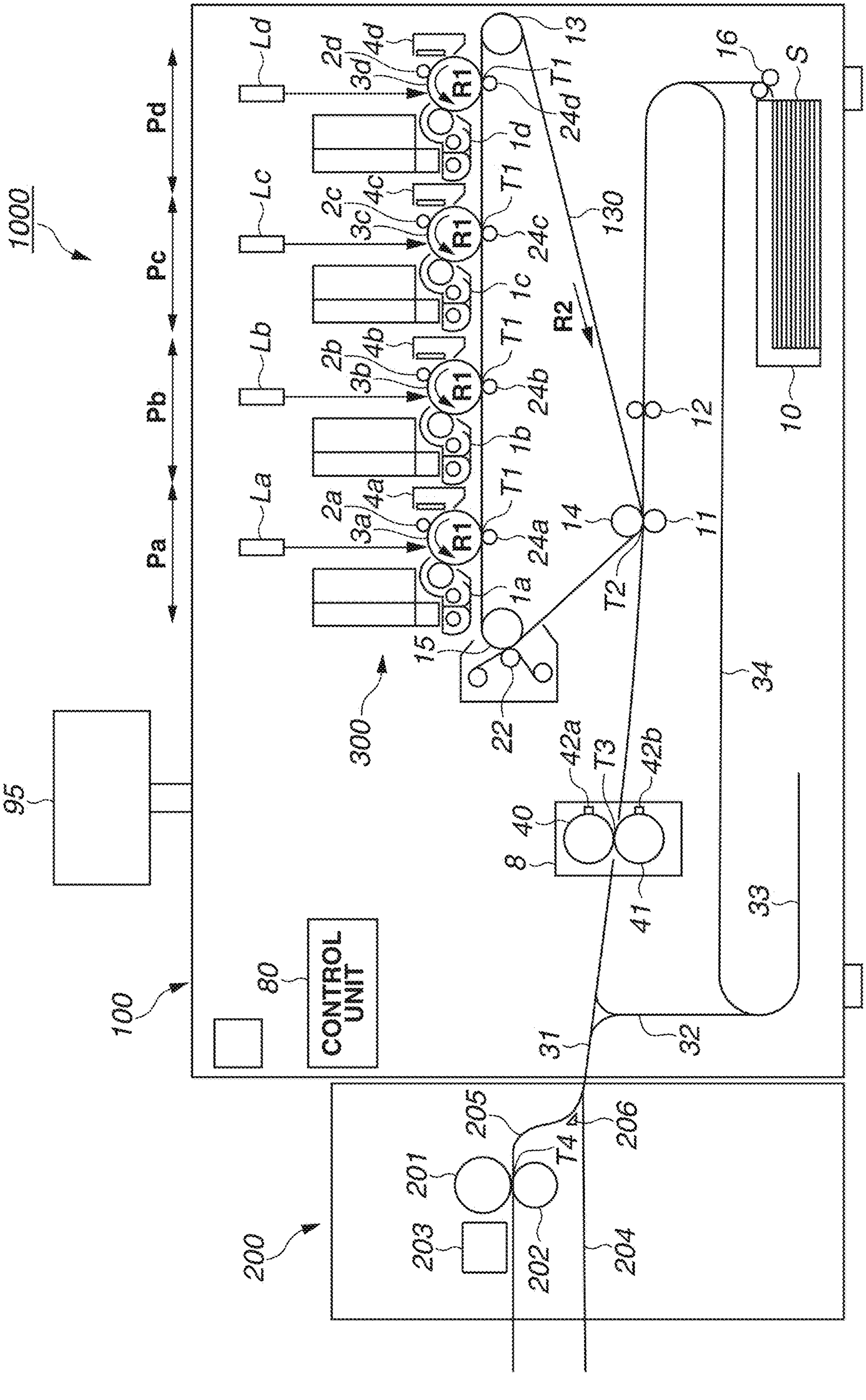
FIG. 1 is a schematic diagram illustrating an example of an image forming apparatus according to an exemplary embodiment.
Figure 2:
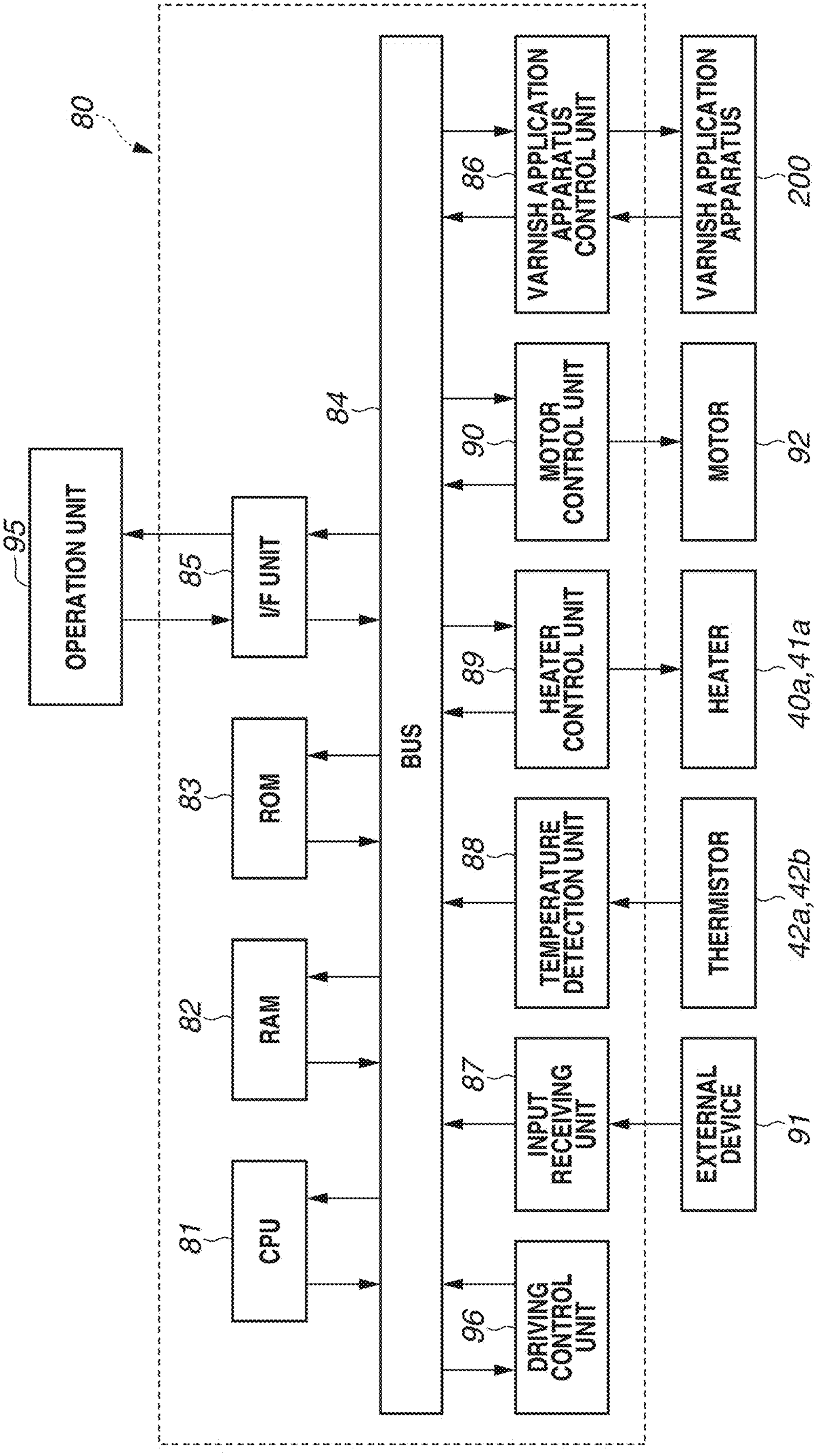
FIG. 2 is a control block diagram illustrating a control unit.

The image forming apparatus 100 illustrated in FIG. 1 is a tandem-type full-color electrophotographic printer. The image forming apparatus 100 includes image forming portions Pa, Pb, Pc, and Pd for forming images in respective colors of yellow, magenta, cyan, and black. The image forming apparatus 100 forms a toner image on a recording medium S according to an image signal received from an external apparatus 91 (FIG. 2) such as a personal computer communicably connected to a document reading apparatus (not illustrated) or the image forming apparatus 100.

In the present exemplary embodiment, the image forming portions Pa to Pd, primary transfer rollers 24*a* to 24*d*, an intermediate transfer belt 130, a plurality of rollers 13 to 15, and a secondary transfer outer roller 11 constitute an image forming unit 300 for forming a toner image on a recording medium S. Further, various types of sheet media, e.g., paper such as plain paper, thick paper, rough paper, concavo-convex paper, recycled paper, and coated paper, a plastic film (resinous medium), and fabric can be considered as examples of recording media S on which the image forming apparatus 100 can execute image forming processing. Coated paper, which may include enamel, gloss, and slick sheet media, may include a layer coated by a mixture of materials or a polymer to, for example, impart predetermined qualities to the paper. A type of paper that does not include such a coated layer or includes a layer that does not meet predetermined requirements may be referred to as a paper without having a coated layer.

As illustrated in FIG. 1, the image forming portions Pa, Pb, Pc, and Pd are arranged next to each other in a moving direction of the intermediate transfer belt 130. The intermediate transfer belt 130 is stretched by a plurality of rollers 13, 14, and 15 and moves in a direction indicated by an arrow R2. The intermediate transfer belt 130 bears and conveys a toner image transferred thereon. The secondary transfer outer roller 11 is arranged at a position opposite to a secondary transfer inner roller 14 that stretches the intermediate transfer belt 130 with the intermediate transfer belt 130 therebetween, so that a secondary transfer portion T2 for transferring the toner image borne on the intermediate transfer belt 130 onto a recording medium S is formed by the secondary transfer inner roller 14 and the secondary transfer outer roller 11. A fixing device 8 is arranged on a downstream side of the secondary transfer portion T2 in a conveyance direction of the recording medium S.

A cassette 10 that stores recording medium S is arranged on a lower portion of the image forming apparatus 100. The recording medium S is conveyed by conveyance rollers 16 toward registration rollers 12 from the cassette 10. Thereafter, the registration rollers 12 start rotating in synchronization with conveyance of the toner image formed on the intermediate transfer belt 130 through processing to be described below, so that the recording medium S is conveyed to the secondary transfer portion T2. Although only one cassette 10 is illustrated in FIG. 1, a plurality of cassettes 10 capable of storing recording media S having different sizes and thicknesses may be included in the image forming apparatus 100. In this case, a recording medium S is selectively conveyed from any one of the plurality of cassettes 10. Further, a recording medium S placed on a manual sheet-feeding unit (not illustrated) or a recording medium S stored in a container device externally connected to the image forming apparatus 100 can be fed in addition to the recording medium S stored in the cassette 10.

The four image forming portions Pa, Pb, Pc, and Pd included in the image forming apparatus 100 substantially have the same configuration except that development is executed by using different colors. Thus, a yellow image forming portion Pa is described as a representative example thereof, and descriptions of the other image forming portions Pb, Pc, Pd are omitted.

A cylindrical-shaped photosensitive drum 3*a* serving as a photosensitive member is arranged on the image forming portion Pa. The photosensitive drum 3*a* is rotationally driven in a direction indicated by an arrow R1. A charging device 2*a*, an exposure device La, a development device 1*a*, a primary transfer roller 24*a*, and a drum cleaning device 4*a* are arranged in a peripheral area of the photosensitive drum 3*a*.

For example, processing for forming a full color image by using the image forming apparatus 100 will be described. When image forming processing is started, firstly, a surface of the rotating photosensitive drum 3*a* is uniformly charged by the charging device 2*a*. The charging device 2*a* is, for example, a corona charger that irradiates the photosensitive drum 3*a* with charged particles by corona discharge and uniformly charges the photosensitive drum 3*a* with a dark potential having a negative polarity. Then, the photosensitive drum 3*a* is exposed to and scanned with laser light which is emitted from the exposure device La in response to an image signal. Through the processing, an electrostatic latent image according to the image signal is formed on a surface of the photosensitive drum 3*a*. The electrostatic latent image formed on the photosensitive drum 3*a* is developed to a visible toner image with developer containing toner and carriers that is stored in the development device 1*a*. In the present exemplary embodiment, each of the development devices 1*a* to 1*d* uses two-component developer containing nonmagnetic toner and magnetic carriers.

The toner image formed on the photosensitive drum 3*a* is transferred to the intermediate transfer belt 130 at a primary transfer portion T1 formed at between the photosensitive drum 3*a* and the primary transfer roller 24*a* arranged opposite to the photosensitive drum 3*a* with the intermediate transfer belt 130 therebetween. At this time, a primary transfer bias is applied to the primary transfer roller 24*a*. Toner remaining on the surface of the photosensitive drum 3*a* after execution of the transfer processing on the intermediate belt 130 is removed therefrom by the drum cleaning device 4*a*.

The image forming portions Pa to Pd of respective colors of yellow, magenta, cyan, and black sequentially execute the above-described processing, and four color toner images are overlapped with each other on the intermediate transfer belt 130. Thereafter, a recording medium S stored in the cassette 10 is conveyed to the secondary transfer portion T2 at a timing adjusted to a timing when the toner image is formed. Then, a secondary transfer bias is applied to the secondary transfer outer roller 11, so that the full-color toner image formed on the intermediate transfer belt 130 is collectively and transferred to the recording medium S. Toner remaining on the intermediate transfer belt 130 after execution of the transfer processing on the recording medium S is removed therefrom by a belt cleaning device 22.

Subsequently, the recording medium S onto which the toner image is transferred is conveyed to the fixing device 8. The fixing device 8 applies heat and pressure to the recording medium S with the toner image while nipping and conveying the recording medium S, and melts and fixes the toner onto the recording medium S at a fixing nip portion T3. In other words, toner that forms the toner image on the recording medium S is melted and mixed by the heat and the pressure applied thereto, and then the toner image is fixed as a full color toner image on the recording medium S. In this manner, a series of image forming processing is ended.

The image forming apparatus 100 according to the present exemplary embodiment can execute both-side printing. In a case where one-side printing is executed, a recording medium S having passed through the fixing device 8 pass through a discharge conveyance path 31 and is discharged to the outside of the image forming apparatus 100. On the other hand, in a case where both-side printing is executed, a recording medium S having passed through the fixing device 8 is conveyed to a conveyance path 32 and sent to an inverting path 33. The recording medium S sent to the inverting path 33 is switched backward and conveyed to a both-side conveyance path 34, so that the recording medium S is inverted from front to back. The inverted recording medium S is conveyed through the both-side conveyance path 34 toward the registration rollers 12. Then, by a series of processing similar to the processing executed when a toner image is formed on one side of the recording media S, a toner image is formed on the other side of the recording medium S. After the toner images are fixed to the both sides of the recording medium S, the recording medium S passes through the discharge conveyance path 31 and is discharged to the outside of the image forming apparatus 100.

Herein, developer used for developing an electrostatic latent image formed on the photosensitive drum 3*a* into a toner image is described. In the present exemplary embodiment, two-component developer containing toner and carriers is used. The toner has a low-melting point, and contains a binder resin, a coloring agent, and a release agent (wax, for example).

Varnish Application Apparatus

As illustrated in FIG. 1, according to the present exemplary embodiment, a varnish application apparatus 200 serving as a surface processing apparatus is connected to the image forming apparatus 100. The varnish application apparatus 200 can be freely connected to the image forming apparatus 100 as one of the retrofittable peripheral devices (also called "option units") for expanding the functions of the image forming system 1000. For the purpose of giving a luster to and protecting the surface of the recording medium S to give added value thereto, the varnish application apparatus 200 executes surface processing to coat the entire surface of the recording medium S discharged from the image forming apparatus 100 by applying varnish.

The varnish application apparatus 200 does not need to directly be connected to the image forming apparatus 100, and a configuration of an in-line image forming system in which at least one processing apparatus such as an inserter or a stacker is arranged between the image forming apparatus 100 and the varnish application apparatus 200 can be employed.

The above-described varnish application apparatus 200 will be described. The varnish application apparatus 200 includes a tank (not illustrated) for storing varnish, a supply unit (not illustrated) for supplying varnish to an application roller 201 from the tank, the application roller 201 and a counter roller 202, provided opposite to the application roller 201, that form a varnish application nip portion T4 where varnish is applied to a recording medium S. The varnish application apparatus 200 further includes a pressurizing mechanism (not illustrated) for causing the application roller 201 and the counter roller 202 to urge each other, and an ultraviolet lamp 203 for hardening the varnish applied to the recording medium S.

Then, the varnish application apparatus 200 includes a conveyance path branched into a varnish application route 205 as a first conveyance path through which varnish is applied to the recording medium S and a varnish by-pass route 204 as a second conveyance path through which varnish is not applied to the recording medium S, and the conveyance path of the recording medium S is switched between the routes 205 and 204. In other words, by switching a flapper 206, the varnish application apparatus 200 conveys the recording medium S to the varnish application route 205 in a case where the varnish application processing is executed, and conveys the recording medium S to the varnish by-pass route 204 in a case where varnish application processing is not executed. Ultraviolet (UV) varnish that is hardened with ultraviolet light can be used depending on texture desired by the user.

The application roller 201 is formed in a size sufficient for applying varnish supplied from the tank (not illustrated) to approximately the entire area of the recording medium S in a width direction orthogonal to the conveyance direction of the recording medium S. The ultraviolet lamp 203 hardens the varnish that the application roller 201 has applied to the recording medium S by emitting ultraviolet light having a wavelength appropriate for hardening the varnish. Similar to the application roller 201, the ultraviolet lamp 203 can emit UV light to approximately the entire area of the recording medium S in the width direction thereof. The ultraviolet lamp 203 is turned on only in a case where the varnish application processing is executed.

Instead of using a roller system including the application roller 201 and the counter roller 202, an ejection-type line head, for example, may be used as a unit for applying varnish to the recording medium S. In a case where the line head is used, varnish can be applied to an optional position of the recording medium S instead of the entire surface thereof. Accordingly, an image of a line, a symbol, or a character can be formed with varnish by using the line head. Further, although UV varnish is used in the present exemplary embodiment, oil-based varnish or water-based varnish can also be used. In a case where oil-based varnish or water-based varnish is used, it is desirable that an infrared ray (IR) lamp be used as a drying unit for drying varnish instead of the ultraviolet lamp 203. Further, varnish may be dried with air, such as warm air, or may be dried with a combination of an IR lamp and warm air.

Control Unit

The image forming apparatus 100 includes a control unit 80. The control unit 80 will be described with reference to FIG. 2. In addition to the devices illustrated in FIG. 2, various devices such as a motor and a power source for operation of the image forming apparatus 100 are connected to the control unit 80. However, illustration or descriptions thereof will be omitted because they are not main features of the present disclosure.

The control unit 80 serving as a control unit executes various types of control of the image forming apparatus 100 such as image forming processing. The control unit 80 includes a central processing unit (CPU) 81, a random access memory (RAM) 82, and a read only memory (ROM) 83. For example, the ROM 83 stores various programs and data used for controlling the image forming system 1000. The CPU 81 executes the various programs stored in the ROM 83 to cause the image forming apparatus 100 and the varnish application apparatus 200 to execute processing.

According to the present exemplary embodiment, as described below, the CPU 81 controls the temperatures of the fixing roller 40 and the pressure roller 41 included in the fixing device 8. The RAM 82 stores working data and input data. Further, the RAM 82 can temporarily store a result of calculation processing performed in association with execution of various programs.

In addition to the RAM 82 and the ROM 83, an input/output interface unit (hereinafter, called "I/F unit") 85, a varnish application apparatus control unit 86, an input receiving unit 87, a temperature detection unit 88, and a motor control unit 90 are connected to the CPU 81 via a bus 84. The CPU 81 can receive a printing signal from an operation unit 95 via the I/F unit 85 that is an example of a receiving unit. The printing signal is generated according to the processing content set by the user, and includes various types of information such as execution/non-execution of various types of processing such as image forming processing and varnish application processing, the number of sheets to be processed, and a type of recording medium S to be subjected to the various types of processing.

The operation unit 95 includes a touch panel display capable of key input and display. The operation unit 95 receives instructions to execute various programs such as image forming processing and various types of data input by the user. The I/F unit 85 receives a printing signal according to an input performed by the user via the operation unit 95. For example, the operation unit 95 appropriately display various screens, e.g., a display screen for displaying an operation state of the image forming apparatus 100 or the varnish application apparatus 200 and a menu screen for providing various executable programs.

In the present exemplary embodiment, when the user inputs an instruction to execute an image forming job, the user can also input information about whether to execute varnish application processing for processing a surface of a recording medium S with varnish in addition to information about whether to execute printing processing in a color mode or a monochrome mode and information about a type of the recording medium S. The operation unit 95 may be comprising a hardware key and a display. Alternatively, a display device of the external apparatus 91 such as a personal computer connected to the operation unit 95 via a wired or wireless communication network may be used as the operation unit 95.

The CPU 81 can acquire an image signal and various types of data from the external apparatus 91 via the input receiving unit 87 as an example of the receiving unit. In the present exemplary embodiment, the CPU 81 can also acquire information about whether to execute varnish application processing when an instruction to execute an image forming job is received from the external apparatus 91. Although not illustrated, the image forming apparatus 100 (FIG. 1) includes a document reading device. The CPU 81 can also acquire an image signal of a document read by the document reading device via the input receiving unit 87. The acquired image signal is stored as image data in the RAM 82.

The temperature detection unit 88 detects the temperatures of the fixing roller 40 and the pressure roller 41 based on results of detection by the thermistors 42*a* and 42*b*. The CPU 81 controls the heater control unit 89 based on the temperatures detected by the temperature detection unit 88. The heater control unit 89 controls the heaters 40*a* and 41*a* to adjust the temperatures of the fixing roller 40 and the pressure roller 41 to target temperatures. In the present exemplary embodiment, as a target temperature for fixing a toner image to the recording medium S, for example, the CPU 81 causes the heater control unit 89 to control the heater 40*a* to adjust the surface temperature of the fixing roller 40 to a desired temperature within a range of 140° C. to 190° C. In order to appropriately fix a toner image to the recording medium S and also give a luster to the fixed toner image, the target temperature of the fixing roller 40 is set to a predetermined temperature depending on a type and a basis weight of the recording medium S. On the other hand, the CPU 81 causes the heater control unit 89 to control the heater 41*a* to maintain the surface temperature of the pressure roller 41 to, for example, 100° C. to 120° C.

The motor control unit 90 controls rotation of the motor 92. The CPU 81 controls the rotation speed of the fixing roller 40 via the motor control unit 90 to adjust the conveyance speed of the recording medium S in the fixing device 8 when a toner image is fixed to the recording medium S.

The varnish application apparatus control unit 86 controls the varnish application apparatus 200 connected to the image forming apparatus 100. The CPU 81 controls the varnish application apparatus 200 by transmitting and receiving an electric signal via the bus 84. Therefore, in a case where the electric signal cannot be transmitted and received between the image forming apparatus 100 and the varnish application apparatus 200 via the bus 84, the CPU 81 can determine that the image forming apparatus 100 and the varnish application apparatus 200 are not connected to each other.

In the present exemplary embodiment, a configuration in which the image forming apparatus 100 includes the varnish application apparatus control unit 86 has been described. However, the configuration is not limited thereto. For example, the varnish application apparatus control unit 86 may be arranged on the varnish application apparatus 200 and may be configured to communicate with the CPU 81 to electrically connect the varnish application apparatus 200 to the image forming apparatus 100.

The driving control unit 96 executes conveyance control by controlling the conveyance units such as the conveyance rollers 16 and the registration rollers 12 of the image forming apparatus 100. Further, the driving control unit 96 executes control relating to image processing. The driving control unit 96 further controls a driving motor (not illustrated) included in the image forming apparatus 100 to rotationally drive the image forming portions Pa, Pb, Pc, and Pd and the intermediate transfer belt 130.

In the configuration described in the present exemplary embodiment, the driving control unit 96 executes control for the conveyance and the image forming processing in the image forming apparatus 100. However, the control operations may be executed by a plurality of respective control units.

Evaluation of Adhesiveness of Varnish Layer to Sheet

Next, evaluation of adhesiveness of a varnish layer to a sheet will be described. The adhesiveness of a varnish layer to a sheet was evaluated using various sheets on which varnish application processing was executed. The evaluation of adhesiveness of a varnish layer to a sheet may be based on evaluation of a coated material's resistance (film's hardness) to scratch effects due to the sliding of pencils of various hardness (e.g., H to >6H). Here, the evaluation of adhesiveness of a varnish layer to a sheet was executed according to a standardized testing method, Scratch Hardness (Pencil Method), specified in Japanese Industrial Standards (JIS) K5600-5-4.

As the plain paper and the thick paper (non-coated paper) without having a coated layer, "OK Prince High-Quality Paper" having basis weights of 52.3 g/m$^2$, 64 g/m$^2$, 81.4 g/m$^2$, 104.7 g/m$^2$, 127.9 g/m$^2$, 157 g/m$^2$, and 209.3 g/m$^2$, manufactured by Oji Paper Co., Ltd. were used. As the coated paper, "View Hi-Corona A" having a basis weight of 52.3 g/m$^2$, manufactured by Oji F-Tex Co., Ltd., "OK Top Coat Plus" having basis weights of 73.3 g/m$^2$, 84.9 g/m$^2$, 104.7 g/m$^2$, 127.9 g/m$^2$, and 157 g/m$^2$, manufactured by Oji Paper Co., Ltd., and "UPM Finesse Gloss" having a basis weight of 200 g/m$^2$, manufactured by UPM-Kymmene Corporation were used. As the synthetic paper, "New Yupo" having basis weights of 51.4 g/m$^2$, 73.2 g/m$^2$, 84.7 g/m$^2$, 100.1 g/m$^2$, 115.5 g/m$^2$, 158 g/m$^2$, and 200 g/m$^2$, manufactured by Yupo Corporation were used. Furthermore, as the resin media, "VF-1420N" having a basis weight of 144 g/m$^2$, manufactured by KOKUYO Co., Ltd. and "BG-72 WO" having a thickness of 0.125 mm (a basis weight of 180 g/m$^2$) and a thickness of 0.180 mm (a basis weight of 250 g/m$^2$), manufactured by folex, Ltd. were used. Each of the above-described sheets of coated paper is a recording medium having a coated layer that has a coating weight of 20 g/m$^2$ to 40 g/m$^2$.

Herein, with respect to a reference sample obtained by applying the varnish used for the evaluation to a glass plate on which no toner image was formed and hardening the varnish thereon, the above-described scratch hardness of the reference sample was measured, and the measurement result indicated a hardness of "6H". Therefore, in this evaluation, an acceptable level was specified as a scratch hardness of "6H" or more. A result of the measurement is illustrated in FIG. 3. As illustrated in FIG. 3, with respect to the coated paper, the synthetic paper, and the resinous medium, the scratch hardness was "6H" or more. However, with respect to the plain paper and the thick paper, the scratch hardness was "3H" or less, and did not satisfy "6H".

Each of the above-described coated paper, synthetic paper, and resinous medium contains a coated layer on its surface and thus varnish does not easily penetrate into a recording medium S. Therefore, when varnish (UV varnish) is applied to a recording medium S by the application roller 201, the varnish tends to stay on the surface of the recording medium S. In the evaluation, scratch hardness of varnish applied to each of the coated paper, the synthetic paper, and the resinous medium showed "6H" or more. It can be considered that this is because the varnish was accumulated on surface of the recording medium S and the accumulated varnish on the recording medium S was sufficiently hardened with UV light emitted from the ultraviolet lamp 203.

Further, each of the above-described plain paper and thick paper does not have a coated layer on its surface. Therefore, varnish (UV varnish) can easily penetrate into the recording medium S when the varnish is applied by the application roller 201. In the evaluation, scratch hardness of varnish applied to the plain paper and the thick paper showed "3H" or less. It can be considered that this is because the varnish could not sufficiently be hardened because UV light emitted from the ultraviolet lamp 203 could not reach the internal portion of the recording medium S.

Based on the above-described evaluation result, it was found that varnish is hard to adhere to the recording medium S and easily comes off in a case where non-coated paper such as the plain paper or the thick paper without having a coated layer is used as the recording medium S. It was also found that, in comparison to a recording medium having a coated layer such as coated paper, non-coated paper is hard to achieve a three-dimensional appearance and a glossy appearance that can be given by varnish because varnish easily penetrates into the non-coated paper. Accordingly, even if varnish application processing is executed on the non-coated paper, there is a possibility that products desired by the user cannot be acquired.

However, all of the above-described non-coated paper such as plain paper and thick paper, coated paper, synthetic paper, and resinous medium are recording media on which the image forming apparatus 100 can form an image. Thus, there is a possibility that the user may erroneously issue an instruction to execute varnish application processing for the plain paper or the thick paper. Accordingly, the image forming system 1000 executes varnish application processing on the non-coated paper, and it may result in products in which varnish easily comes off or which cannot give a desired stereoscopic appearance or a desired glossy appearance. Thus products that the user desires may not be obtained.

Therefore, in the present exemplary embodiment, the image forming system 1000 prevents varnish application processing from being set for non-coated paper without having a coated layer when the user performs print settings so as to prevent a situation where the user cannot acquire desired products.

Control Performed by Image Forming System

Figure 4:
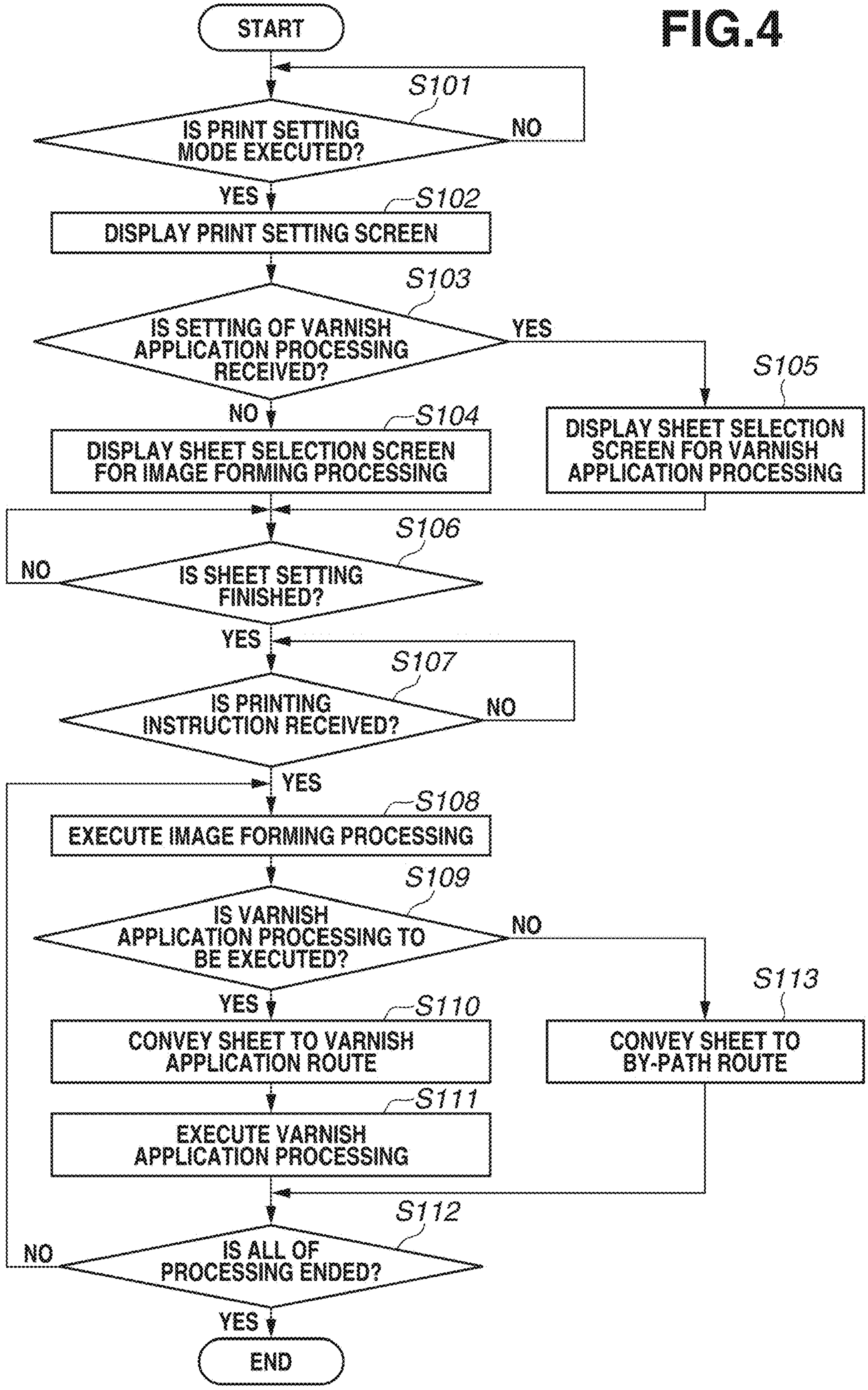
FIG. 4 is a flowchart illustrating control processing according to a first exemplary embodiment.

Subsequently, operation and control performed by the image forming system 1000 according to the present exemplary embodiment will be described with reference to a flowchart. FIG. 4 is a flowchart illustrating control processing performed by the image forming system 1000.

The control processing in FIG. 4 is started when a printing signal is received in a stand-by state where adjustment of the entire image forming system 1000 is completed. Herein, the stand-by state refers to a state where the temperature of the fixing device 8 has reached a predetermined temperature at which a toner image is fixable, and a state where the image forming apparatus 100 can promptly form an image on a recording medium when a printing signal is received. The stand-by state also refers to a state where varnish is supplied to the application roller 201, and the irradiation power of the ultraviolet lamp 203 reaches a predetermined irradiation power, and a state where the varnish application apparatus 200 can apply varnish to a recording medium and harden the varnish applied thereto.

In the present exemplary embodiment, a description is given of a case where the user performs print setting via the operation unit 95; however, similar control processing can also be executed when the user performs print setting using the external apparatus 91.

In a case where print setting is performed using the external apparatus 91, a display screen described below is displayed on a display unit arranged on the external apparatus 91.

The CPU 81 can execute a print setting mode for executing setting relating to image forming processing and another processing when the user operates the operation unit 95. This print setting mode is executed when the user operates a software key such as "Print Setting" displayed on the operation unit 95.

Figure 5:
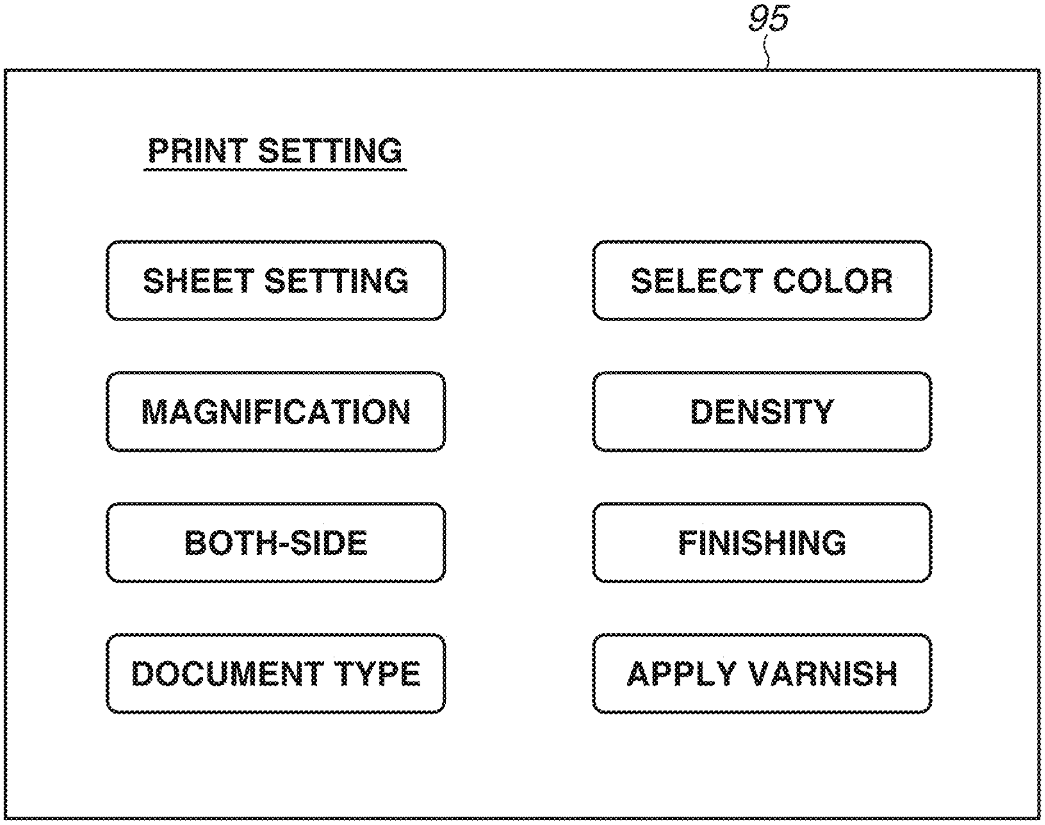
FIG. 5 is a diagram illustrating a print setting screen displayed on an operation unit.

In step S101, it is determined whether the print setting mode is executed by the user. In a case where the print setting mode is executed by the user (YES in step S101), the processing proceeds to step S102. In step S102, the CPU 81 displays a print setting screen on the operation unit 95. FIG. 5 illustrates an example of the print setting screen. In the print setting screen in FIG. 5, software keys such as "Sheet Setting", "Magnification", "Both-Side", "Document Type", "Select Color", "Density", "Finishing", and "Apply Varnish" are displayed on the operation unit 95. The user can input detailed settings with respect to an item indicated by each of the software keys by operating the software key. Further, a selection key different from the software keys illustrated in FIG. 5 may also be arranged thereon.

If an instruction to execute the print setting mode is not received (NO in step S101), the CPU 81 waits until an instruction to execute the print setting mode is received, and the image forming system 1000 remains in the stand-by state.

Next, in step S103, the CPU 81 determines whether a software key of "Apply Varnish" is operated on the print setting screen.

If a setting of "Apply Varnish" is not received (NO in step S103), the processing proceeds to step S104. In step S104, the CPU 81 displays a sheet selection screen for image forming processing on the operation unit 95. In addition, in step S103, the CPU 81 may determine that a setting of varnish application processing is not received and advance the processing to step S104 when only a setting of image forming processing is received.

Figure 6A:
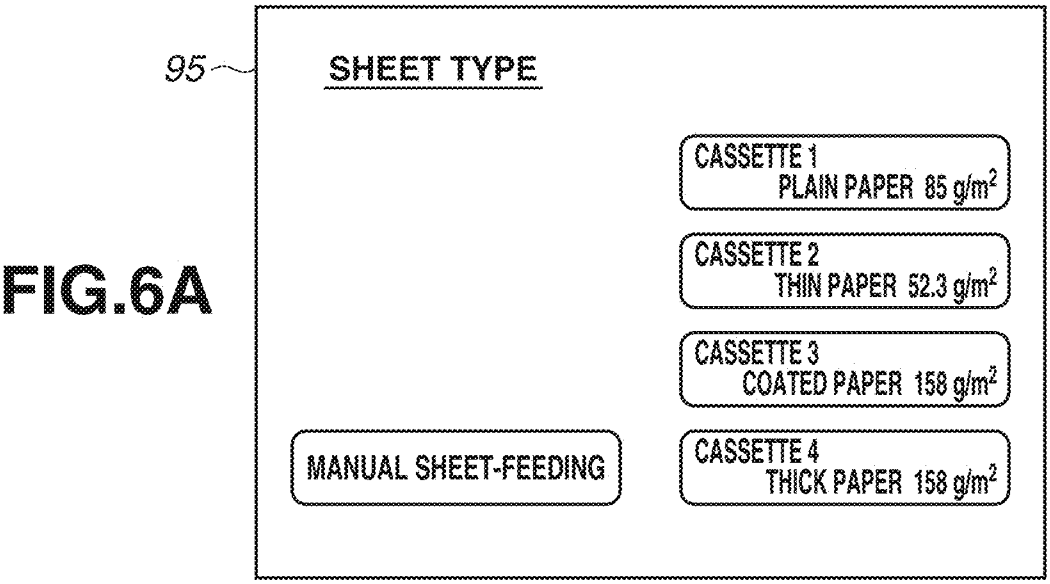
FIGS. 6A to 6E are diagrams illustrating sheet setting screens displayed on the operation unit.

FIG. 6A illustrates an example of the sheet selection screen for image forming processing. As illustrated in FIG. 6A, all of recording media that can be fed by the image forming apparatus 100 are displayed in a selectable state on the sheet selection screen for image forming processing, and the types of selectable recording media are not limited. In other words, the user can select any of the plurality of types of recording media displayed on the sheet selection screen in FIG. 6A.

Although the image forming apparatus 100 described in the present exemplary embodiment includes four cassettes, which stores respective different recording media, a configuration thereof is not limited thereto. For example, in a case where a container device is connected to the image forming apparatus 100 as an option device, a software key corresponding to the recording media stored in the container device may additionally be displayed on the sheet selection screen in FIG. 6A.

The user can input a setting relating to which recording medium is to be used for executing image forming processing by operating any one of the software keys corresponding to recording media displayed on the sheet selection screen in FIG. 6A.

On the other hand, if a setting of "Apply Varnish" is received (YES in step S103), the processing proceeds to step S105. In step S105, the CPU 81 displays a sheet selection screen for varnish application processing on the operation unit 95.

Figure 6B:
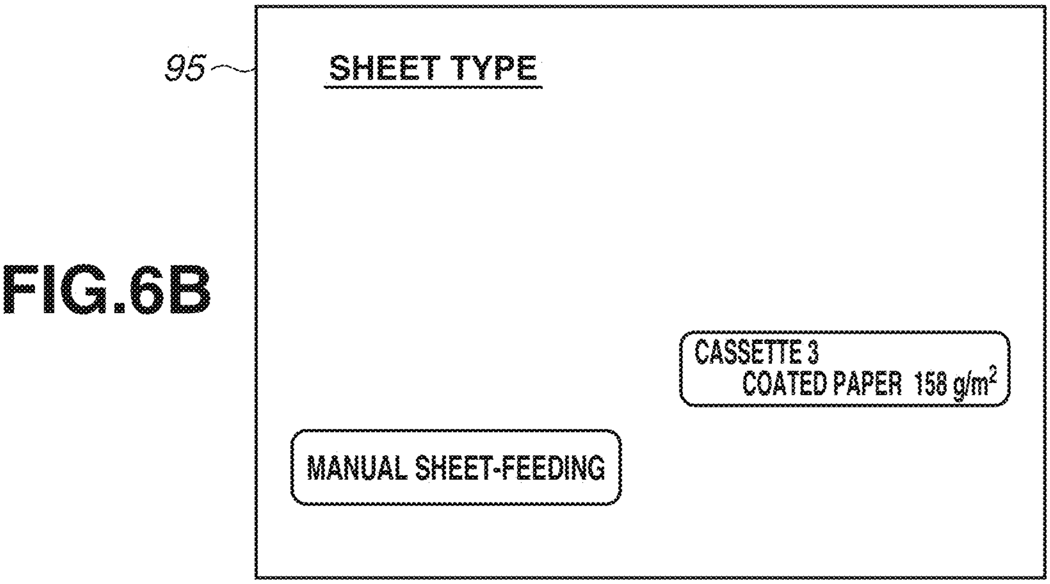

FIG. 6B illustrates an example of the sheet selection screen for varnish application processing. As illustrated in FIG. 6B, in the sheet selection screen for varnish application processing, only a recording medium on which the varnish application apparatus 200 can execute varnish application processing is displayed in a selectable state. The recording medium on which the varnish application apparatus 200 can execute varnish application processing refers to coated paper having a coated layer on its surface. As described above, in the present exemplary embodiment, plain paper, thick paper, rough paper, concavo-convex paper, recycled paper, and fabric are determined as the non-coated paper. Further, coated paper, resinous media such as an overhead transparency (OHT) sheet and a film mainly consisting of a plastic film, and synthetic paper are determined as the coated paper. In the present exemplary embodiment, the coated paper, the resinous media such as an OHT sheet and a film mainly consisting of a plastic film, and the synthetic paper are examples of the first type recording media, whereas the plain paper, the thick paper, the rough paper, the concavo-convex paper, the recycled paper, and the fabric are examples of the second type recording media. In the present exemplary embodiment, based on a result of the above-described testing, paper having a coated layer of a coating weight of 20 $g/m^2$ to 40 $g/m^2$ is defined as the coated paper. In addition, a recording medium having a coated layer of a coating weight of 12 $g/m^2$ or 15 $g/m^2$ can also be used as the coated paper as long as varnish does not penetrate the recording medium.

The user can input a type of a recording medium on which image forming processing and varnish application processing are to be executed by operating any of software keys corresponding to recording media displayed on the sheet selection screen in FIG. 6B.

In the present exemplary embodiment, as illustrated in FIG. 6B, in order to prevent a situation where varnish application processing is executed on a recording medium other than coated paper, only a recording medium having a coated layer (i.e., coated paper) is displayed in a selectable state. Accordingly, in FIG. 6B, from among the recording media in FIG. 6A which can be fed by the image forming apparatus 100, options other than the coated paper are hidden. In the present exemplary embodiment, although the sheet selection screen is described with respect to the case where the image forming apparatus 100 stores only one type of coated paper, a plurality of types of recording media may be displayed on the sheet selection screen in FIG. 6B if a plurality of types of coated paper is stored in the image forming apparatus 100.

Figure 6C:
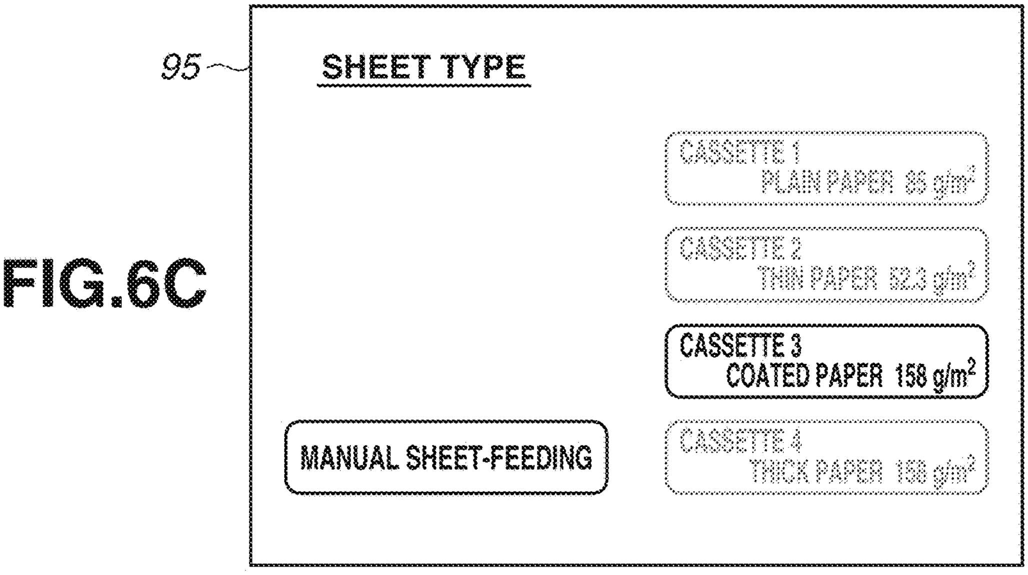
Figure 6D:
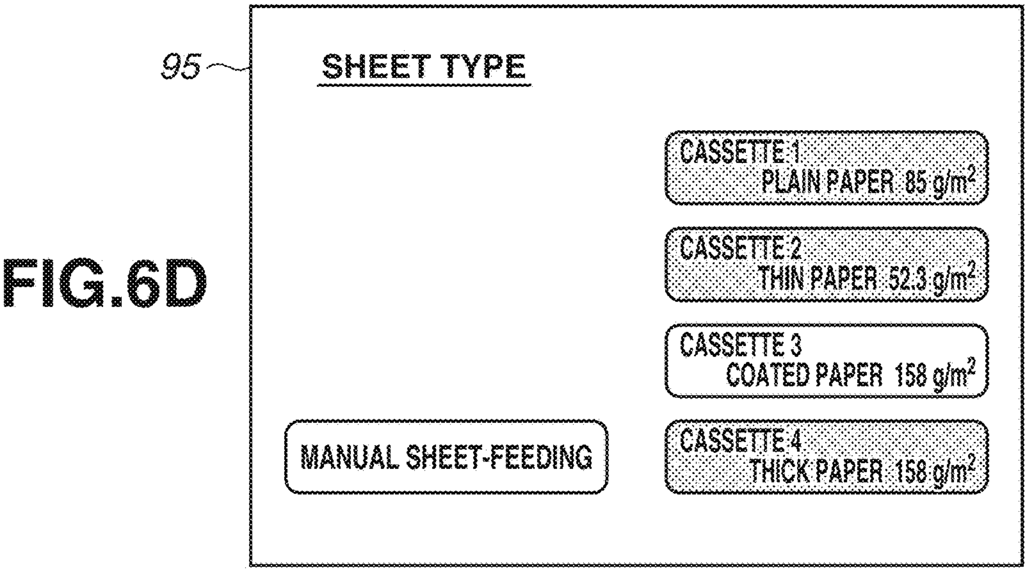
Figure 6E:
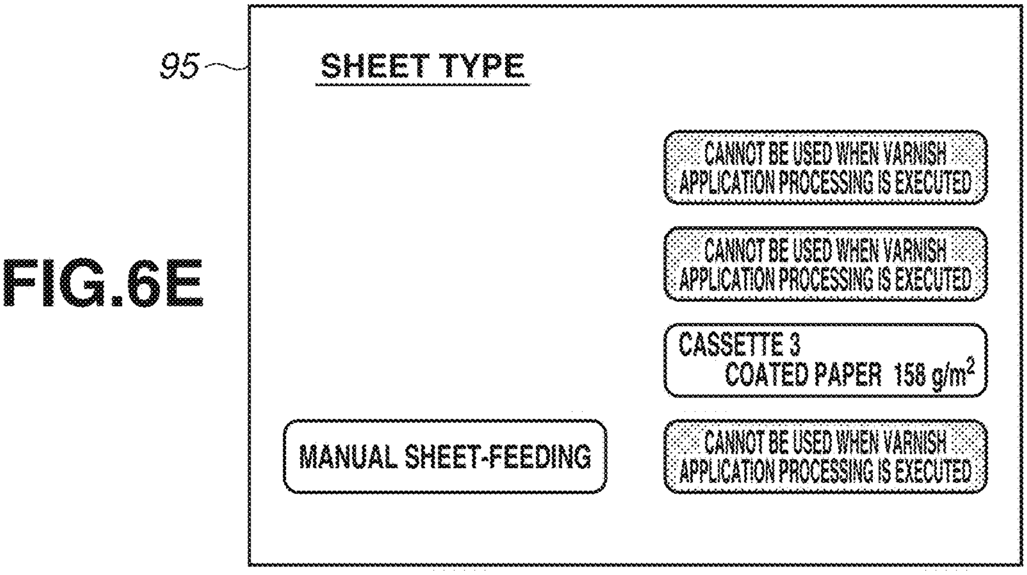

Further, the sheet selection screen may have another configuration as long as only a recording medium having a coated layer (i.e., coated paper) can be displayed on and selected from the sheet selection screen. For example, as illustrated in FIG. 6C, software keys corresponding to the non-coated paper may be displayed with a color lighter than a color used for displaying a software key corresponding to the coated paper. Further, as illustrated in FIG. 6D, software keys corresponding to the non-coated paper may be darkened or shaded with halftone dots, so that the software keys corresponding to the non-coated paper are less visible than the software key corresponding to the coated paper. Furthermore, as illustrated in FIG. 6E, the software keys corresponding to recording media other than coated paper may be displayed so that the user can recognize that they are not usable. In the display shown in FIGS. 6C to 6E, the software key corresponding to the non-coated paper is displayed in an unselectable state (grayed out).

Further, a software key corresponding to the manual sheet-feeding unit (not illustrated) is displayed in a selectable state on the sheet selection screen because the user may place coated paper thereon. However, if the image forming apparatus 100 does not have a manual sheet-feeding unit, the software key corresponding to the manual sheet-feeding unit does not need to be displayed thereon.

As described above, according to the present exemplary embodiment, the user performs an input operation on any of the sheet selection screens illustrated in FIGS. 6A to 6E, so that the CPU 81 can receive a setting of image forming processing or varnish application processing with respect to a recording medium selected by the user.

Then, in step S106, the CPU 81 determines whether the user has finished sheet setting on the sheet selection screen displayed in step S104 or S105. If sheet setting is not finished (NO in step S106), the CPU 81 waits until the sheet setting is finished.

If sheet setting is finished (YES in step S106), the processing proceeds to step S107. In step S107, the CPU 81 determines whether an instruction to execute printing processing in steps S101 to S106 is received from the user via the operation unit 95.

If an instruction to execute printing processing is not received (NO in step S107), the CPU 81 waits until the instruction to execute printing processing is received. The instruction to execute printing processing can be received when the user operates a start key displayed as a software key on the operation unit 95 or a start key provided as a hard key provided on the operation unit 95.

If an instruction to execute printing processing is received (YES in step S107), the processing proceeds to step S108. In step S108, the CPU 81 controls the driving control unit 96 to execute image forming processing based on the information set in step S102. Herein, the CPU 81 feeds a recording medium set in step S105 from the cassette 10 or a separately provided recording medium containing device and executes image forming processing on the fed recording medium.

Then, in step S109, based on the processing information set in step S102, the CPU 81 determines whether to execute varnish application processing on the recording medium on which an image is formed in step S108.

Then, if the varnish application processing is to be executed (YES in step S109), the processing proceeds to step S110. In step S110, the CPU 81 causes the varnish application apparatus control unit 86 to operate the flapper 206 to convey the recording medium S on which image forming processing is executed in step S108 to the varnish application route 205. In step S111, the CPU 81 controls the varnish application apparatus control unit 86 to execute varnish application processing on the recording medium conveyed to the varnish application route 205.

Thereafter, in step S112, the CPU 81 determines whether all of image forming processing and varnish application processing is ended. If not all of the processing is ended (NO in step S112), the processing returns to step S108, and the CPU 81 executes the processing on a next recording medium. In this manner, by returning the processing to step S108 after executing the varnish application processing, the CPU 81 can alternately output products acquired by executing varnish application processing on a recording medium S and products acquired without executing varnish application processing.

On the other hand, in a case where varnish application processing is not to be executed on the recording medium S on which an image is formed in step S108 (NO in step S109), the processing proceeds to step S113. In step S113, the CPU 81 causes the varnish application apparatus control unit 86 to operate the flapper 206 to convey the recording medium S on which an image is formed in step S108 to the varnish by-pass route 204. Thereafter, in step S112, the CPU 81 determines whether all of image forming processing and varnish application processing included in the printing signals received in steps S101 to S106 is ended. If all of the processing is ended (YES in step S112), the CPU 81 brings the image forming system 1000 into a stand-by state, and the processing is ended. If not all of the processing is ended (NO in step S112), the processing returns to step S108, and the CPU 81 executes the processing on a next recording medium S.

As described above, in a case where "Apply Varnish" is selected when an input operation relating to print setting is performed by the user, the CPU 81 does not accept a setting with respect to non-coated paper on the sheet selection screen. In other words, when "Apply Varnish" is selected, the CPU 81 does not permit an input with respect to non-coated paper on the sheet selection screen.

This configuration can prevent the user from erroneously inputting an instruction to execute varnish application processing with respect to non-coated paper. Therefore, it is possible to prevent a situation where products desired by the user cannot be acquired for the reason that varnish easily comes off or a desired stereoscopic appearance and a glossy appearance cannot achieved.

Further, it is also possible to prevent lowering of workability caused by a situation where the user needs to output products obtained by executing varnish application processing on coated paper again by inputting the processing information including a new setting of a recording medium S after outputting products obtained by executing varnish application processing on non-coated paper.

Next, a second exemplary embodiment will be described. In the above-described first exemplary embodiment, a description has been given of an example where the user performs sheet setting to set a type of recording medium S after performing setting of varnish application processing. The present exemplary embodiment is different from the first exemplary embodiment in that the user performs setting of varnish application processing after performing sheet setting. In the below-described image forming system 1000, main components of the image forming apparatus 100 and the varnish application apparatus 200 are similar to those described in the first exemplary embodiment. Therefore, the same reference numerals are applied thereto, and descriptions thereof are omitted.

In the present exemplary embodiment, the processing will be described with respect to a case where "Sheet Setting" is selected by the user on the print setting screen illustrated in FIG. 5 before selecting "Apply Varnish". In the present exemplary embodiment, a description is given of a case where the user performs print setting via the operation unit 95; however, similar control processing can also be executed when the user performs print setting using the external apparatus 91. In a case where print setting is performed using the external apparatus 91, a display screen described below is displayed on the display unit arranged on the external apparatus 91.

First, in step S201, the CPU 81 displays the sheet selection screen illustrated in FIG. 6A on the operation unit 95. As illustrated in FIG. 6A, all of recording media that can be fed by the image forming apparatus 100 are displayed in a selectable state on the sheet selection screen displayed in step S201.

Then, in step S202, the CPU 81 determines whether the user has finished sheet setting via the sheet selection screen displayed in step S201. If sheet setting is not finished (NO in step S202), the CPU 81 waits until sheet setting is finished, so that the image forming system 1000 remains in the stand-by state.

If sheet setting is finished (YES in step S202), the processing proceeds to step S203. In step S203, the CPU 81 displays the print setting screen in FIG. 5 again, and receives another print setting.

Next, in step S204, the CPU 81 determines whether an instruction to execute printing processing set in steps S201 to S203 is received from the user via the operation unit 95. If an instruction to execute printing processing is not received (NO in step S204), the CPU 81 waits until the execution instruction of printing processing is received. In addition, an instruction to execute printing processing can be received when the user operates a software key corresponding to a start key displayed on the operation unit 95 or a hardware key corresponding to a start key arranged on the operation unit 95.

If an instruction to execute printing processing is received (YES in step S204), the processing proceeds to step S205. In step S205, the CPU 81 determines whether a software key of "Apply Varnish" is operated on the print setting screen.

In a case where a setting of "Apply Varnish" is received (YES in step S205), the processing proceeds to step S206. In step S206, the CPU 81 determines whether a type of the recording medium set in step S201 is the above-described non-coated paper without having a coated layer. If non-coated paper is selected (YES in step S206), the processing proceeds to step S207. In step S207, the CPU 81 displays the sheet selection screen for varnish application processing illustrated in FIG. 6B on the operation unit 95, and prompts the user to newly set a recording medium. The content of setting in FIG. 6B is similar to that described in the first exemplary embodiment, so that description thereof is omitted.

Thereafter, in step S208 on the sheet selection screen for varnish application processing displayed in step S207, the CPU 81 determines whether the user has finished setting of a new recording medium. In a case where setting of a new recording medium is not performed (NO in step S208), the CPU 81 waits until setting of a new recording medium is finished. In a case where setting of a new recording medium is performed (YES in step S208), the CPU 81 advances the processing to step S209.

In addition, the CPU 81 also advances the processing to step S209 if a setting of "Apply Varnish" is not received (NO in step S205) or if coated paper is set as a recording medium S (NO in step S206).

Then, in step S209, the CPU 81 controls the driving control unit 96 to feed a recording medium set in step S201 or S207 from the cassette 10 or a separately provided recording medium containing device, and executes image forming processing on the fed recording medium.

In step S210, based on the processing information set in the print setting screen, the CPU 81 determines whether to execute varnish application processing on the recording medium on which an image is formed in step S209.

Then, in a case where the varnish application processing is to be executed (YES in step S210), the processing proceeds to step S211. In step S211, the CPU 81 causes the varnish application apparatus control unit 86 to operate the flapper 206 to convey the recording medium S on which image forming processing is executed in step S209 to the varnish application route 205. In step S212, the CPU 81 controls the varnish application apparatus control unit 86 to execute varnish application processing on the recording medium S conveyed to the varnish application route 205.

Thereafter, in step S213, the CPU 81 determines whether all of image forming processing and varnish application processing included in the print settings received in steps S201 to S208 is ended. In a case where not all of the processing is ended (NO in step S213), the processing returns to step S209, and the CPU 81 executes the processing on a next recording medium S. In this manner, by returning the processing to step S208 after executing the varnish application processing, the CPU 81 can alternately output products acquired by executing varnish application processing on a recording medium S and products acquired without executing varnish application processing.

On the other hand, in a case where varnish application processing is not to be executed on the recording medium on which an image is formed in step S209 (NO in step S210), the processing proceeds to step S214. In step S214, the CPU 81 causes the varnish application apparatus control unit 86 to operate the flapper 206 to convey the recording medium on which image forming processing is executed in step S209 to the varnish by-pass route 204. Thereafter, in step S213, the CPU 81 determines whether all of image forming processing and varnish application processing included in the printing settings received in steps S201 to S208 is ended. In a case where all of the processing is ended (YES in step S213), the CPU 81 brings the image forming system 1000 into a stand-by state, and the processing is ended. In a case where not all of the processing is ended (NO in step S213), the processing returns to step S209, and the CPU 81 executes the processing on a next recording medium.

In the present exemplary embodiment, the CPU 81 displays the sheet selection screen for varnish application processing in step S207, and prompts the user to set a new recording medium. However, the CPU 81 may display a software key of "Cancel" on the sheet selection screen in FIG. 6B to prompt the user to perform print setting from the beginning.

As described above, in a case where the user has selected "Apply Varnish" after setting of non-coated paper is performed on the sheet selection screen, the CPU 81 prompts the user to newly set a recording medium. In other words, when "Apply Varnish" is selected, the CPU 81 does not permit an input operation with respect to non-coated paper on the sheet selection screen.

This configuration can prevent the user from erroneously inputting an execution instruction of varnish application processing with respect to non-coated paper. Therefore, it is possible to prevent a situation where products desired by the user cannot be acquired for the reason that varnish easily comes off or a desired stereoscopic appearance and a glossy appearance cannot be achieved.

Further, it is also possible to prevent lowering of workability caused by a situation where the user needs to output products obtained by executing varnish application processing on coated paper again by inputting the processing information including a new setting of a recording medium S after outputting products obtained by executing varnish application processing on non-coated paper.

Figure 7:
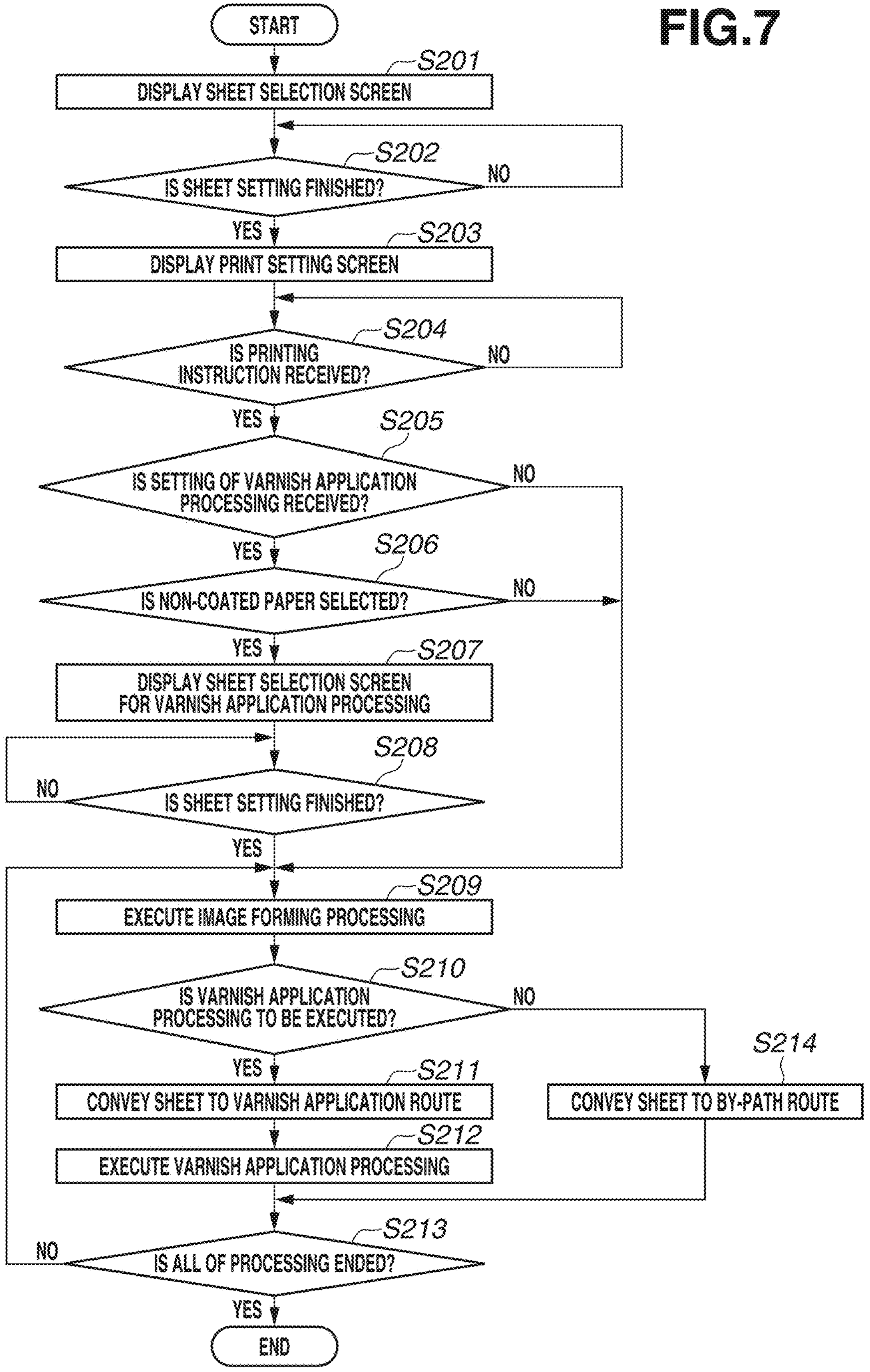
FIG. 7 is a flowchart illustrating control processing according to a second exemplary embodiment.

Further, the CPU 81 may execute control based on the flowchart in FIG. 7 if "Sheet Setting" is selected before "Apply Varnish" is selected on the print setting screen in FIG. 5, and may execute control based on the flowchart in FIG. 6 if "Apply Varnish" is selected before "Sheet Setting" is selected on the print setting screen in FIG. 5.

Next, a third exemplary embodiment will be described. The present exemplary embodiment is different from the above-described exemplary embodiments in that a thickness of a varnish layer applied to the recording medium S can be changed by the varnish application apparatus 200. In the below-described image forming system 1000, main components of the image forming apparatus 100 and the varnish application apparatus 200 are similar to those described in the first exemplary embodiment. Therefore, the same reference numerals are applied thereto, and descriptions thereof are omitted.

A configuration of the image forming system 1000 according to the present exemplary embodiment is different from that of the above-described first exemplary embodiments in that a thickness of a varnish layer applied to a recording medium S can be changed optionally. This configuration is implemented by changing an amount of varnish supplied to the application roller 201 set by a supply unit (not illustrated) and abutting pressure applied to the application roller 201 and the counter roller 202 set by a pressurizing mechanism (not illustrated). In the present exemplary embodiment, for example, the supply unit and the pressurizing mechanism of the varnish application apparatus 200 can be set such that a thickness of varnish is 10 μm, 20 μm, or 30 μm. The varnish application apparatus 200 changes a thickness of a varnish layer applied in varnish application processing based on processing information included in the printing signal input by the user.

A measurement result of a curl amount of a sheet after varnish application processing is illustrated in FIG. 8. This measurement result was acquired by applying varnish layers of different thicknesses to coated paper having different basis weights by executing varnish application processing using the image forming system 1000 according to the present exemplary embodiment.

Sheets of coated paper, "View Hi-Corona A", having a basis weight of 52.3 g/m$^2$, manufactured by Oji F-Tex Co., Ltd., and "OK Top Coat Plus" having basis weights of 73.3 g/m$^2$, 79.1 g/m$^2$, 84.9 g/m$^2$, 104.7 g/m$^2$, and 127.9 g/m$^2$, manufactured by Oji Paper Co., Ltd., were used as recording media, and all of them were A3-size paper.

According to the result of measuring stiffness of the above-described recording media by the gurley method stipulated in "Pulp and Paper Testing Method No. 40-83: A Testing Method of Stiffness of Paper and Paperboard employing a Load-Bending Method", published by Japan Technical Association of the Pulp and Paper Industry (J.TAPPI), it was found that stiffness of a recording medium depends on a basis weight or a thickness of the recording medium. In other words, stiffness of a recording medium can be presumed based on the basis weight or the thickness of the recording medium.

An application thickness of varnish was changed by adjusting an amount of varnish supplied to the application roller 201 and a contact pressure between the application roller 201 and the recording medium S.

After varnish application processing was executed on a recording medium, the recording medium was placed on a flat plate with a processed surface thereof facing upward, and a maximum value of a distance from a surface of the flat plate to an edge of the recording medium was acquired as a curl amount of the recording medium.

Further, in the present exemplary embodiment, an allowable maximum curl amount was specified as "10 mm".

As illustrated in FIG. 8, when the application thickness of varnish was 10 μm, a curl amount of coated paper having a basis weight of 73.3 g/m$^2$ or more did not exceed the allowable maximum curl amount. Further, when the application thickness of varnish was 20 μm or 30 μm, a curl amount of coated paper having a basis weight of 79.1 g/m$^2$ or more did not exceed the allowable maximum curl amount.

In other words, if varnish application processing is executed on thin coated paper or coated paper with low stiffness, curl or undulation caused by shrinkage of a varnish layer may occur in the recording medium when varnish is dried or hardened, depending on the thickness of the varnish layer. Such a recording medium with a large amount of curl or undulation can deteriorate the quality of products. Further, there is a possibility of occurrence of conveyance failure caused by a curled recording medium jammed inside a conveyance path. Furthermore, in a case where another processing such as binding processing or folding processing is executed on a recording medium after the varnish application apparatus 200 executes varnish application processing thereon, there is a possibility that the other processing cannot be executed because of the curl generated in the recording medium. However, according to the present exemplary embodiment, it is possible to prevent a situation where the user cannot acquire desired products because of the curl generated in the recording medium.

Control Performed by Image Forming System

Figure 9:
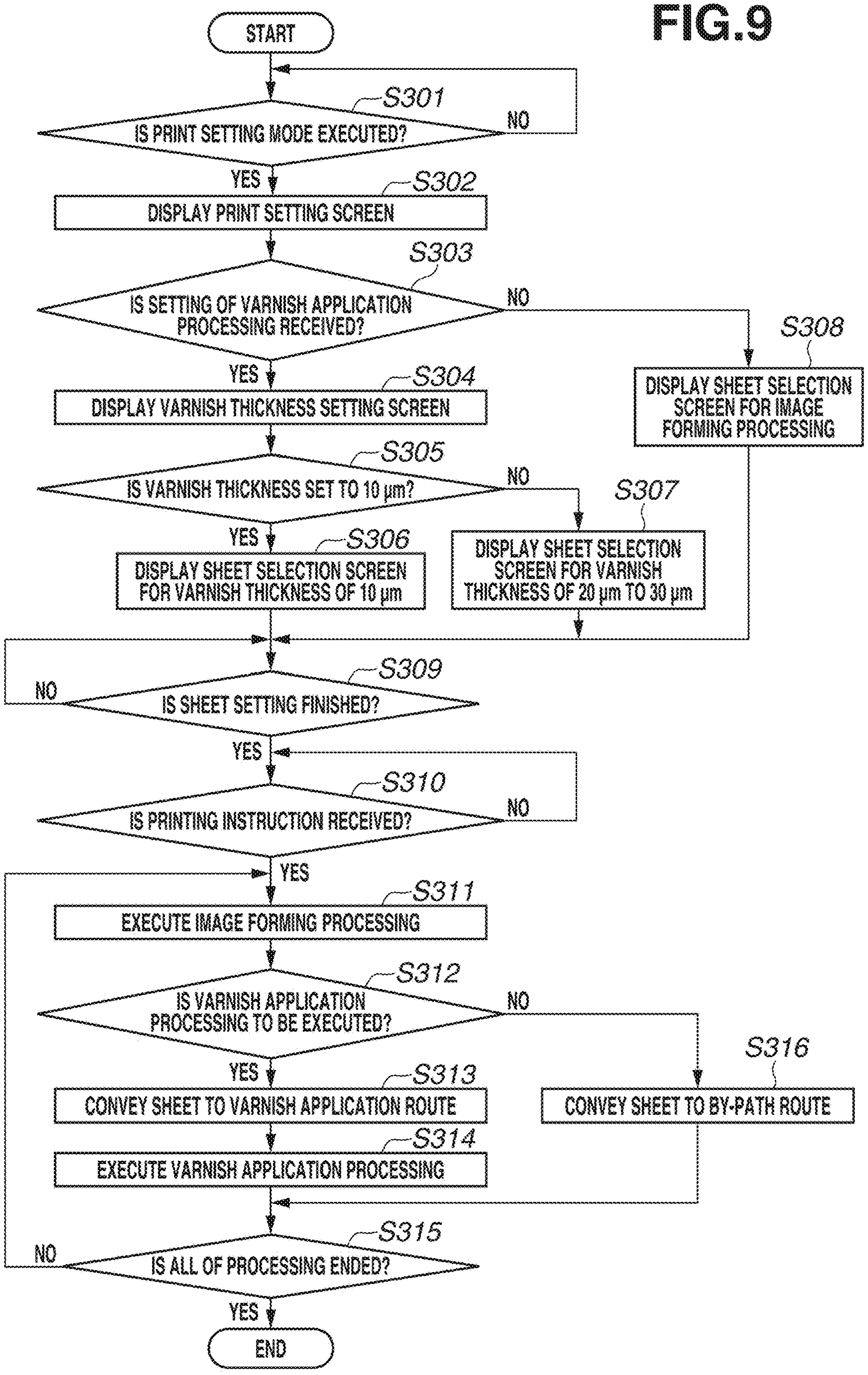
FIG. 9 is a flowchart illustrating control processing according to a third exemplary embodiment.

Subsequently, operation and control performed by the image forming system 1000 according to the present exemplary embodiment will be described with reference to a flowchart. FIG. 9 is a flowchart illustrating control processing performed by the image forming system 1000 according to the present exemplary embodiment.

The control processing in FIG. 9 is started when a printing signal is received in a stand-by state where adjustment of the entire image forming system 1000 is completed. Herein, the stand-by state refers to a state where a temperature of the fixing device 8 has reached a predetermined temperature at which a toner image is fixable, and a state where the image forming apparatus 100 can promptly form an image on a recording medium when a printing signal is received. The stand-by state also refers to a state where varnish is supplied to the application roller 201, and the irradiation power of the ultraviolet lamp 203 has reached a predetermined irradiation power, and a state where the varnish application apparatus 200 can apply varnish to a recording medium and harden the varnish applied thereto.

In the present exemplary embodiment, a description is given of a case where the user performs print setting via the operation unit 95; however, similar control processing can also be executed when the user performs print setting using the external apparatus 91.

In a case where print setting is performed using the external apparatus 91, a display screen described below is displayed on the display unit arranged on the external apparatus 91.

The CPU 81 can execute a print setting mode for executing setting relating to image forming processing and another processing when the user operates the operation unit 95. This print setting mode is executed when the user operates a software key such as "Print Setting" displayed on the operation unit 95.

In step S301, it is determined where the print setting mode is to be executed. In a case where the print setting mode is executed by the user (YES in step S301), the processing proceeds to step S302. In step S302, the CPU 81 displays the print setting screen in FIG. 5 on the operation unit 95.

If an input operation of the print setting mode is not received (NO in step S301), the CPU 81 waits until the input operation of the print setting mode is received, and the image forming system 1000 remains in the stand-by state.

In step S303, the CPU 81 determines whether a software key of "Apply Varnish" is operated on the print setting screen.

Figure 10A:
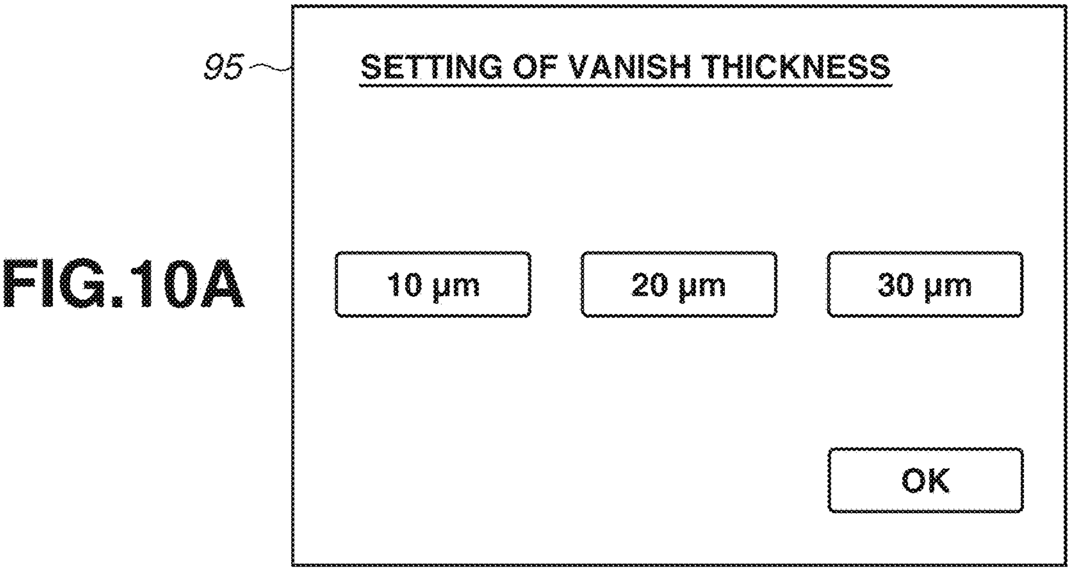
FIGS. 10A, 10B, and 10C are diagrams illustrating setting screens displayed on an operation unit according to the third exemplary embodiment.

If a setting of "Apply Varnish" is received (YES in step S303), the processing proceeds to step S304. In step S304, the CPU 81 displays a varnish thickness setting screen illustrated in FIG. 10A on the operation unit 95. FIG. 10A illustrates an example of the varnish thickness setting screen. As illustrated in FIG. 10A, a thickness of varnish applied by the varnish application apparatus 200 in varnish application processing can be selected via the varnish thickness setting screen. As described above, in the present exemplary embodiment, a thickness of varnish to be applied by the varnish application apparatus 200 in varnish application processing can be set to any one of 10 μm, 20 μm, and 30 μm. The user can select a thickness of varnish to be applied in varnish application processing by operating any one of software keys "10 μm", "20 μm", and "30 μm"

displayed on the varnish thickness setting screen in FIG. 10A. Further, the user can set a thickness of varnish by pressing a software key "OK" after selecting any one of the software keys of respective thicknesses illustrated in FIG. 10A.

Then, in step S305, the CPU 81 determines whether a thickness of varnish set in step S304 is 10 μm. If a thickness of varnish is set to 10 μm (YES in step S305), the processing proceeds to step S306. In step S306, the CPU 81 displays a sheet selection screen for a varnish thickness of 10 μm illustrated in FIG. 10B on the operation unit 95. As described above, in a case where 10 μm is selected as a thickness of varnish, even if coated paper is used as a recording medium, a curl amount of the recording medium after varnish application processing will be increased if a basis weight thereof is less than 73.3 $g/m^2$.

Figure 10B:
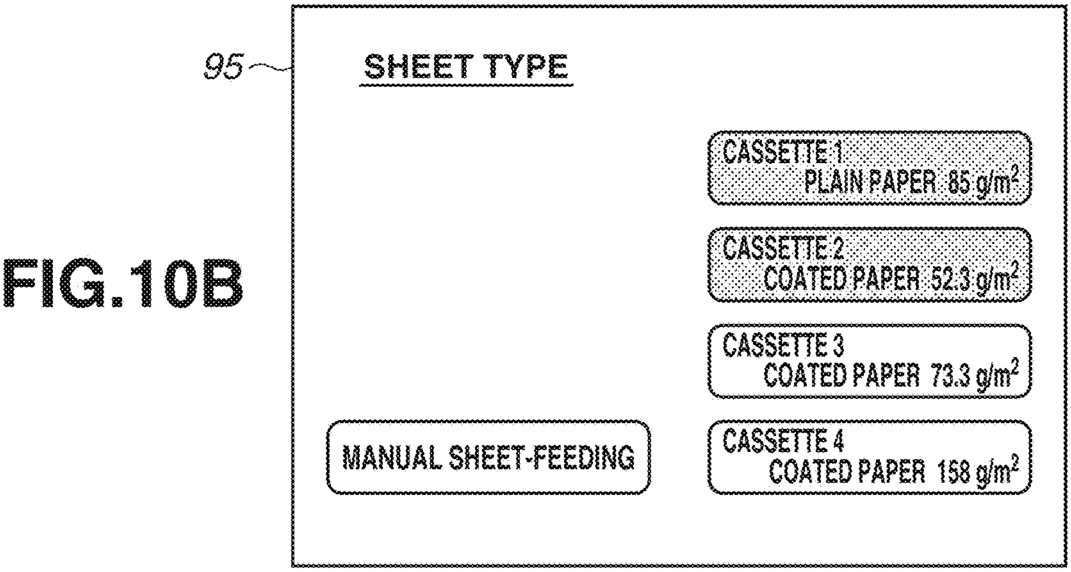

Accordingly, in the present exemplary embodiment, it prevents a situation where varnish application processing is executed on a recording medium other than coated paper or coated paper having a basis weight less than 73.3 $g/m^2$. Thus, as illustrated in FIG. 10B, only a recording medium having a coated layer (i.e., coated paper) having a basis weight of 73.3 $g/m^2$ or more is displayed in a selectable state. In FIG. 10B, from among the recording media that can be fed by the image forming apparatus 100, options other than coated paper having a basis weight of 73.3 $g/m^2$ or more are displayed in a display color darker than a display color of the other options (i.e., grayed out).

Further, if a thickness of varnish set in step S304 is not 10 μm (NO in step S305), i.e., if 20 μm or 30 μm is selected as a thickness of varnish in step S304, the processing proceeds to step S307. In step S307, the CPU 81 displays a sheet selection screen for a varnish thickness of 20 μm to 30 μm illustrated in FIG. 10C on the operation unit 95. As described above, in a case where a thickness of varnish is 20 μm or more, even if coated paper is used as a recording medium, a curl amount of the recording medium after varnish application processing will be increased when a basis weight of the recording medium is less than 79.1 $g/m^2$.

Figure 10C:
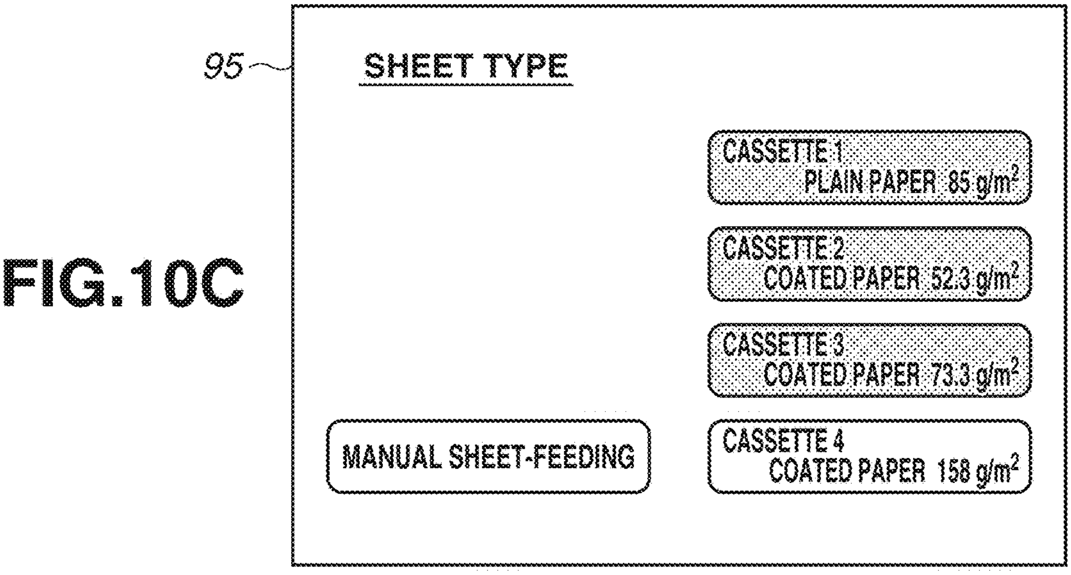

Accordingly, in the present exemplary embodiment, it prevents a situation where varnish application processing is executed on a recording medium other than coated paper or coated paper having a basis weight less than 79.1 $g/m^2$. Thus, as illustrated in FIG. 10C, only a recording medium having a coated layer (i.e., coated paper) having a basis weight of 79.1 $g/m^2$ or more is displayed in a selectable state. In FIG. 10C, from among the recording media that can be fed by the image forming apparatus 100, options other than coated paper having a basis weight of 79.1 $g/m^2$ or more are displayed in a display color darker than a display color of the other options (i.e., grayed out).

As described above, when varnish application processing is executed, a curl amount of a recording medium will be increased as a thickness of varnish is increased. Accordingly, in the sheet selection screen illustrated in FIG. 10C, the number of types of selectable recording media is less than that of selectable recording media displayed on the sheet selection screen in FIG. 10B.

Further, another configuration may also be employed as long as a recording medium having a coated layer (i.e., coated paper) having a basis weight greater than or equal to a predetermined basis weight depending on the thickness of varnish can be displayed and selected via any of the sheet selection screens in FIGS. 10B and 10C. For example, as illustrated in FIG. 6B, a software key corresponding to a recording medium other than coated paper and a software key corresponding to coated paper having a basis weight less than the predetermined basis weight depending on the thickness of varnish may be hidden. Furthermore, as illustrated in FIGS. 6C to 6E, a software key corresponding to a recording medium other than coated paper and a software key corresponding coated paper having a basis weight less than the predetermined basis weight depending on the thickness of varnish may be displayed in a discriminable manner so that the user can understand that the software key cannot receive the input operation.

Further, a software key corresponding to the manual sheet-feeding unit (not illustrated) is displayed in a selectable state because the user may place coated paper thereon. However, if the image forming apparatus 100 does not have a manual sheet-feeding unit, the option of "Manual Sheet-Feeding" does not need to be displayed.

On the other hand, if a setting of "Apply Varnish" is not received (NO in step S303), the processing proceeds to step S308. In step S308, the CPU 81 displays a sheet selection screen for image forming processing on the operation unit 95. Similar to the sheet selection screen illustrated in FIG. 6A, the sheet selection screen for image forming processing according to the present exemplary embodiment displays all of the software keys illustrated in FIG. 10B or 10C in a usable state, and the types of selectable recording media are not limited.

In step S303, the CPU 81 may determine that a setting of varnish application processing is not received and advances the processing to step S308 when only a setting of image forming processing is received.

Then, in step S309, the CPU 81 determines whether sheet setting is finished on the sheet selection screen displayed in any one of steps S306 to S308. If sheet setting is not finished (NO in step S309), the CPU 81 waits until sheet setting is finished.

As described above, according to the present exemplary embodiment, when the user performs an input operation via any of the display screens illustrated in FIGS. 6A, 10B, and 10C, the CPU 81 can receive a setting of image forming processing or varnish application processing with respect to the recording medium selected by the user.

In a case where sheet setting is finished (YES in step S309), the processing proceeds to step S310. In step S310, the CPU 81 determines whether an instruction to execute printing processing set by the user via the operation unit 95 in steps S301 to S306 is received. In a case where an instruction to execute printing processing is not received (NO in step S310), the CPU 81 waits until an instruction to execute printing processing is received. In addition, an instruction to execute printing processing can be received when the user operates a software key corresponding to a start key displayed on the operation unit 95 or a hardware key corresponding to a start key arranged on the operation unit 95.

In a case where an instruction to execute printing processing is received (YES in step S310), the processing proceeds to step S311. In step S311, the CPU 81 controls the driving control unit 96 to execute image forming processing based on the information set in steps S301 to S306. Herein, the CPU 81 feeds a recording medium set in any one of steps S306 to S308 from the cassette 10 or separately provided recording medium containing device and executes image forming processing on the fed recording medium.

Then, in step S312, based on the processing information set in steps S303 to S305, the CPU 81 determines whether to execute varnish application processing on the recording medium on which an image is formed in step S311.

Then, in a case where the varnish application processing is to be executed (YES in step S312), the processing proceeds to step S313. In step S313, the CPU 81 causes the varnish application apparatus control unit 86 to operate the flapper 206 to convey the recording medium S on which image forming processing is executed in step S311 to the varnish application route 205. In step S314 the CPU 81 controls the varnish application apparatus control unit 86 to execute varnish application processing on the recording medium S conveyed to the varnish application route 205 based on the thickness set in step S304.

Thereafter, in step S315, the CPU 81 determines whether all of the image forming processing and the varnish application processing is ended. If not all of the processing is ended (NO in step S315), the processing returns to step S311, and the CPU 81 executes the processing on a next recording medium. As described above, by returning the processing to step S311 after executing the varnish application processing, the CPU 81 can alternately output products acquired by executing varnish application processing on a recording medium S and products acquired without executing varnish application processing.

On the other hand, in a case where varnish application processing is not to be executed on the recording medium S on which an image is formed in step S311 (NO in step S312), the processing proceeds to step S316. In step S316, the CPU 81 causes the varnish application apparatus control unit 86 to operate the flapper 206 to convey the recording medium S on which image forming processing is executed in step S311 to the varnish by-pass route 204. Thereafter, in step S315, the CPU 81 determines whether all of the image forming processing and the varnish application processing is ended. If all of the processing is ended (YES in step S315), the CPU 81 brings the image forming system 1000 into a stand-by state, and the processing is ended. If not all of the processing is ended (NO in step S315), the processing returns to step S311, and the CPU 81 executes the processing on a next recording medium S.

As described above, in a case where "Apply Varnish" is selected when an input operation relating to print setting is performed by the user, the CPU 81 does not accept a setting with respect to non-coated paper on the sheet selection screen. Further, the CPU 81 does not accept a setting with respect to coated paper in which a curl amount can increase depending on a thickness of varnish applied in the varnish application processing. In other words, when "Apply Varnish" is selected, the CPU 81 does not permit an input with respect to non-coated paper and an input with respect to coated paper having a basis weight less than a predetermined basis weight on the sheet selection screen.

This configuration can prevent the user from erroneously inputting an instruction to execute varnish application processing with respect to non-coated paper. The configuration can also prevent the user from inputting an instruction to execute varnish application processing with respect to a recording medium in which a curl amount is expected to be increased when varnish application processing is executed thereon. With the above-described configuration, it is possible to prevent a situation where products desired by the user cannot be acquired for the reason that varnish easily comes off or a desired stereoscopic appearance and a glossy appearance cannot be achieved. It is also possible to prevent a situation where products desired by the user cannot be acquired and a situation where conveyance failure occurs because of a curled recording medium.

Further, it is also possible to prevent lowering of workability caused by a situation where the user needs to output products obtained by executing varnish application processing on coated paper again by inputting the processing information including a new setting of a recording medium S after outputting products obtained by executing varnish application processing on non-coated paper.

In the present exemplary embodiment, the user performs sheet setting to set a type of recording medium S after setting varnish application processing. However, as described in the second exemplary embodiment, the user may set the varnish application processing after performing sheet setting. In this case, similar to the second exemplary embodiment, a screen prompting the user to newly set a recording medium may be displayed on the operation unit 95 when varnish application processing is set.

Further, in the present exemplary embodiment, the varnish application apparatus 200 includes the varnish by-pass route 204. However, the varnish application apparatus 200 may have another configuration as long as the recording medium can be conveyed without applying varnish. For example, a varnish removing unit for removing varnish from a surface of the application roller 201 is included in the varnish application apparatus 200. Then, when non-coated paper is used as a recording medium S, supply of varnish to the application roller 201 is stopped, and varnish remaining on the surface of the application roller 201 is removed thereby. After the varnish remaining on the surface of the application roller 201 is removed, the recording medium S is conveyed through the varnish application route 205 in this manner, so that the varnish application apparatus 200 can discharge the recording medium S on which varnish application processing is not to be executed without changing the conveyance path.

Further, if an ink-jet line head is employed as a component for applying varnish to the recording medium S, the varnish application apparatus 200 can optionally stop applying varnish by controlling the line head. With this configuration, the varnish application apparatus 200 can also discharge the recording medium S on which varnish application processing is not to be executed by conveying the recording medium S through the varnish application route 205 without changing the conveyance path.

Furthermore, in the above-described exemplary embodiment, control of the entire image forming system 1000 is executed by the control unit 80 included in the image forming apparatus 100. However, the configuration is not limited thereto. For example, control of the entire image forming system 1000 may be executed by an external apparatus that is a body independent of the image forming apparatus 100 and is connected to the image forming apparatus 100 such that data can be input and output to and from the image forming apparatus 100. Further, control of the entire image forming system 1000 may be executed by a control unit arranged on the varnish application apparatus 200.

According to the present disclosure, an image forming system executes varnish application processing on a recording medium on which an image is formed by an image forming apparatus as an in-line process, and can prevent a situation where products desired by the user cannot be acquired.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming system comprising:

an image forming unit configured to execute image forming processing to form an image on a recording medium;

a varnish application unit configured to execute varnish application processing to apply varnish to the recording medium on which the image is formed by the image forming unit;

a receiving unit configured to receive an instruction for selecting a type of recording medium from at least a first type recording medium and a second type recording medium, and to receive an instruction for the varnish application processing, wherein the first type recording medium has a coat layer in a state before the image is formed, and the second type recording medium does not have a coat layer in the state before the image is formed; and a control unit configured to perform control, wherein, in a case where the receiving unit receives an instruction for the varnish application processing with the first type recording medium being selected, the control unit performs control on the image forming unit to form an image over the coat layer of the first type recording medium and performs control on the varnish application unit to apply a varnish over the coat layer of the first type recording medium.

2. The image forming system according to claim 1, wherein, in a case where the receiving unit receives an instruction for the varnish application processing with the second type recording medium being selected, the control unit performs control on the image forming unit not to form an image on the second type recording medium.

3. The image forming system according to claim 1, wherein, in a case where the receiving unit receives an instruction for the varnish application processing with the second type recording medium being selected, the control unit performs control on the receiving unit to again receive an instruction for selecting a type of recording medium.

4. The image forming system according to claim 3, wherein the receiving unit includes a display unit configured to display keys for selecting the type of recording medium on which image forming processing is executable by the image forming unit, and wherein, in a case where the control unit performs the control on the receiving unit to again receive an instruction for selecting a type of recording medium, the control unit performs control to cause the display unit to display a key for selecting the first type recording medium.

5. The image forming system according to claim 3, wherein the receiving unit includes a display unit configured to display keys for selecting the type of recording medium on which image forming processing is executable by the image forming unit, and wherein, in a case where the control unit performs the control on the receiving unit to again receive an instruction for selecting a type of recording medium, the control unit performs control to cause the display unit to display, in an unselectable state, a key for selecting the second type recording medium.

6. The image forming system according to claim 1, wherein the varnish application unit includes an application roller to apply varnish to the recording medium of the selected type and a counter roller, provided opposite to the application roller, to convey the selected type of recording medium in cooperation with the application roller.

7. The image forming system according to claim 1, wherein the varnish application unit includes a line head for ejecting varnish to the recording medium of the selected type.

8. The image forming system according to claim 1, further comprising:

a first conveyance path through which the recording medium is to be conveyed to execute the varnish application processing by the varnish application unit; and a second conveyance path through which the recording medium is to be conveyed so that the varnish application processing is not executed on the recording medium conveyed through the second conveyance path, wherein, in a case where the image forming processing by the image forming unit is executed without the instruction for the varnish application processing being received by the receiving unit, the control unit performs control to convey the recording medium on which the image is formed by the image forming unit to the second conveyance path.

9. The image forming system according to claim 1, wherein the first type recording medium is a recording medium having a coated layer of a coating weight of 20 grams per square meter ($g/m^2$) to 40 $g/m^2$.

10. The image forming system according to claim 1, wherein the first type recording medium is a recording medium having a coated layer of a coating weight of 12 grams per square meter ($g/m^2$) to 40 $g/m^2$.

11. An image forming apparatus comprising:

an image forming unit configured to execute image forming processing to form an image on a recording medium; and a control unit having a receiving unit and being configured to perform control, wherein the receiving unit is configured to receive an instruction for selecting a type of recording medium from at least a first type recording medium and a second type recording medium, and to receive an instruction for a varnish application unit to execute varnish application processing on the recording medium on which the image is formed by the image forming unit, wherein the first type recording medium has a coat layer in a state before the image is formed, and the second type recording medium does not have a coat layer in the state before the image is formed, and wherein, in a case where the receiving unit receives an instruction for the varnish application processing with the first type recording medium being selected, the control unit performs control on the image forming unit to form an image over the coat layer of the first type recording medium and performs control such that a varnish is applied over the coat layer of the first type recording medium.

* * * * *